US011838159B2

(12) United States Patent
Zhang et al.

(10) Patent No.: US 11,838,159 B2
(45) Date of Patent: Dec. 5, 2023

(54) TECHNIQUES FOR A COMBINED CYCLIC PREFIX AND GUARD INTERVAL-BASED WAVEFORM

(71) Applicant: QUALCOMM Incorporated, San Diego, CA (US)

(72) Inventors: Xiaoxia Zhang, San Diego, CA (US); Jun Ma, San Diego, CA (US); Iyab Issam Sakhnini, San Diego, CA (US); Morteza Soltani, San Diego, CA (US); Jing Sun, San Diego, CA (US); Tao Luo, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/378,568

(22) Filed: Jul. 16, 2021

(65) Prior Publication Data
US 2023/0028826 A1 Jan. 26, 2023

(51) Int. Cl.
H04W 4/00 (2018.01)
H04L 27/26 (2006.01)
H04W 72/0446 (2023.01)
H04W 72/23 (2023.01)

(52) U.S. Cl.
CPC ..... *H04L 27/2607* (2013.01); *H04W 72/0446* (2013.01); *H04W 72/23* (2023.01)

(58) Field of Classification Search
CPC ............. H04L 27/2607; H04L 27/2602; H04L 27/26025; H04W 72/0453; H04W 72/23; H04W 72/0446
See application file for complete search history.

(56) References Cited

U.S. PATENT DOCUMENTS

| 10,498,576 | B2 * | 12/2019 | Baldemair | .......... H04L 27/2607 |
| 2017/0238305 | A1 * | 8/2017 | Chen | .................... H04L 5/0053 370/311 |
| 2019/0132829 | A1 * | 5/2019 | Bhattad | ............. H04W 72/0453 |
| 2019/0254024 | A1 * | 8/2019 | Nam | .................... H04L 27/2607 |
| 2019/0312665 | A1 * | 10/2019 | Jo | ..................... H04L 27/26025 |
| 2020/0374724 | A1 * | 11/2020 | Sarajlic | ................ H04W 24/10 |
| 2021/0135918 | A1 * | 5/2021 | Zewail | ............. H04L 27/26025 |
| 2022/0158883 | A1 * | 5/2022 | Afshang | .......... H04L 27/26025 |
| 2022/0417935 | A1 * | 12/2022 | Sakhnini | ............ H04L 27/2602 |

* cited by examiner

*Primary Examiner* — Abdelnabi O Musa
(74) *Attorney, Agent, or Firm* — Dalei Dong; Holland & Hart LLP

(57) ABSTRACT

Methods, systems, and devices for wireless communication are described. A user equipment (UE) and a base station may communicate according to a combined cyclic prefix and guard interval-based waveform format. The base station may transmit control signaling to the UE. The control signaling may indicate a slot configuration. The UE may identify a format of a slot including a set of symbols based on the slot configuration. The format may indicate that a first portion of a first symbol of the set of symbols includes at least two cyclic prefixes and a second portion of the first symbol includes a guard interval. The UE and the base station may perform wireless communications during the first symbol in accordance with the format.

30 Claims, 18 Drawing Sheets

TECHNIQUES FOR A COMBINED CYCLIC PREFIX AND GUARD INTERVAL-BASED WAVEFORM

FIELD OF DISCLOSURE

The present disclosure, for example, relates to wireless communication systems, more particularly to techniques for a combined cyclic prefix and guard interval-based waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station and a UE may communicate a waveform via symbols in one or more slots according to a cyclic prefix-based or a guard interval-based format. That is, each symbol may include a cyclic prefix or a guard interval appended to the front of the symbol to reduce inter-symbol interference. The guard interval-based format may include more symbols in a slot than the cyclic prefix-based format, but a guard interval for a first symbol in the slot may be located outside of the slot boundaries. In some cases, the base station or the UE may perform a beam switch operation during a cyclic prefix or guard interval duration. If the beam switch operation is longer than a cyclic prefix or guard interval duration, a symbol duration may be allocated for the beam switch operation.

SUMMARY

The described techniques relate to improved methods, systems, devices, and apparatuses that support techniques for a combined cyclic prefix and guard interval-based waveform. For example, the described techniques provide for a UE and a base station to communicate across one or more transmission time intervals (TTIs) according to a cyclic prefix and guard interval-based waveform format. The base station may transmit control signaling to the UE to indicate a configuration for a TTI, such as a slot configuration. The UE may identify a format of a slot based on the control signaling. The format may indicate that a first portion (e.g., a beginning portion) of a first symbol in the slot includes at least two cyclic prefixes and a second portion (e.g., an ending portion) of the first symbol includes a guard interval. The format may additionally indicate that one or more second symbols subsequent to the first symbol in the slot each include a respective guard interval. In some examples, a quantity of cyclic prefixes in the first symbol may be based on a quantity of the one or more second symbols that each include a guard interval. The UE and the base station may perform wireless communications via the first symbol and the one or more second symbols in accordance with the identified format. That is, the UE and the base station may communicate according to a combined cyclic prefix and guard interval-based waveform that may be transmitted via a cyclic prefix symbol concatenated with at least one guard interval symbol.

A method for wireless communication at a UE is described. The method may include receiving control signaling indicating a slot configuration, identifying a format of a slot including a set of symbols based on the slot configuration, where the format indicates that a first portion of a first symbol of the set of symbols includes at least two cyclic prefixes and a second portion of the first symbol includes a guard interval, and performing the wireless communication during the first symbol in accordance with the format.

An apparatus for wireless communication at a UE is described. The apparatus may include a processor, memory coupled with the processor, and instructions stored in the memory. The instructions may be executable by the processor to cause the apparatus to receive control signaling indicating a slot configuration, identify a format of a slot including a set of symbols based on the slot configuration, where the format indicates that a first portion of a first symbol of the set of symbols includes at least two cyclic prefixes and a second portion of the first symbol includes a guard interval, and perform the wireless communication during the first symbol in accordance with the format.

Another apparatus for wireless communication at a UE is described. The apparatus may include means for receiving control signaling indicating a slot configuration, means for identifying a format of a slot including a set of symbols based on the slot configuration, where the format indicates that a first portion of a first symbol of the set of symbols includes at least two cyclic prefixes and a second portion of the first symbol includes a guard interval, and means for performing the wireless communication during the first symbol in accordance with the format.

A non-transitory computer-readable medium storing code for wireless communication at a UE is described. The code may include instructions executable by a processor to receive control signaling indicating a slot configuration, identify a format of a slot including a set of symbols based on the slot configuration, where the format indicates that a first portion of a first symbol of the set of symbols includes at least two cyclic prefixes and a second portion of the first symbol includes a guard interval, and perform the wireless communication during the first symbol in accordance with the format.

Some examples of the method, apparatuses, and non-transitory computer-readable medium described herein may further include operations, features, means, or instructions for performing the wireless communication during a second symbol of the set of symbols, the first symbol and the second symbol may be contiguous in a time domain and where the format indicates that the second symbol includes a second guard interval, and the at least two cyclic prefixes in the first symbol may be based on the second symbol.

Some examples of the method, apparatuses, and non-transitory computer-readable medium described herein may further include operations, features, means, or instructions for performing a discrete Fourier transform (DFT) operation on each of the first symbol and the second symbol and where a first DFT size for the first symbol may be the same as a second DFT size for the second symbol.

Some examples of the method, apparatuses, and non-transitory computer-readable medium described herein may further include operations, features, means, or instructions for receiving the control signaling based on one or more of a beam switch operation or a resource allocation operation, the control signaling enabling the format for the slot and indicating use of the at least two cyclic prefixes.

Some examples of the method, apparatuses, and non-transitory computer-readable medium described herein may further include operations, features, means, or instructions for performing a beam switch operation during one or more of the at least two cyclic prefixes based on the slot configuration.

Some examples of the method, apparatuses, and non-transitory computer-readable medium described herein may further include operations, features, means, or instructions for transmitting the wireless communication via one or more of the at least two cyclic prefixes, where the wireless communication may be based on one or more of a delay spread satisfying a threshold or an absence of a beam switch.

In some examples of the method, apparatuses, and non-transitory computer-readable medium described herein, the control signaling indicates a first configuration for a first subset of symbols of the set of symbols, the first subset of symbols including the first symbol and one or more second symbols.

Some examples of the method, apparatuses, and non-transitory computer-readable medium described herein may further include operations, features, means, or instructions for receiving an indication identifying a second configuration for a second subset of symbols, determining a second format for the second subset of symbols based on the second configuration, and performing the wireless communication during the second subset of symbols in accordance with the second format.

Some examples of the method, apparatuses, and non-transitory computer-readable medium described herein may further include operations, features, means, or instructions for determining a periodicity based on the slot configuration and performing the wireless communication during one or more of the first symbol and a second symbol in the slot based on the periodicity, the second symbol including at least two respective cyclic prefixes and a respective guard interval.

In some examples of the method, apparatuses, and non-transitory computer-readable medium described herein, receiving the control signaling may include operations, features, means, or instructions for receiving a radio resource control (RRC) message including the slot configuration and where determining the format may be further based on the RRC message.

In some examples of the method, apparatuses, and non-transitory computer-readable medium described herein, receiving the control signaling may include operations, features, means, or instructions for receiving one or more of an RRC message, a downlink control information (DCI), or a medium access control-control element (MAC-CE), indicating the slot configuration and where determining the format may be further based on one or more of the RRC message, the DCI, or the MAC-CE.

In some examples of the method, apparatuses, and non-transitory computer-readable medium described herein, the set of symbols, the at least two cyclic prefixes, the guard interval, and one or more other guard intervals corresponding to the set of symbols may be within boundaries of the slot.

In some examples of the method, apparatuses, and non-transitory computer-readable medium described herein, the first portion of the first slot may be at a beginning portion of the first slot and the second portion of the first slot may be at an ending portion of the first slot.

In some examples of the method, apparatuses, and non-transitory computer-readable medium described herein, the wireless communication includes a single carrier waveform.

A method for wireless communication at a base station is described. The method may include identifying a format of a slot including a set of symbols, where the format indicates that a first portion of a first symbol of the set of symbols includes at least two cyclic prefixes and a second portion of the first symbol includes a guard interval, transmitting, to a UE, control signaling indicating a slot configuration based on the format, and performing the wireless communication during the first symbol in accordance with the slot configuration.

An apparatus for wireless communication at a base station is described. The apparatus may include a processor, memory coupled with the processor, and instructions stored in the memory. The instructions may be executable by the processor to cause the apparatus to identify a format of a slot including a set of symbols, where the format indicates that a first portion of a first symbol of the set of symbols includes at least two cyclic prefixes and a second portion of the first symbol includes a guard interval, transmit, to a UE, control signaling indicating a slot configuration based on the format, and perform the wireless communication during the first symbol in accordance with the slot configuration.

Another apparatus for wireless communication at a base station is described. The apparatus may include means for identifying a format of a slot including a set of symbols, where the format indicates that a first portion of a first symbol of the set of symbols includes at least two cyclic prefixes and a second portion of the first symbol includes a guard interval, means for transmitting, to a UE, control signaling indicating a slot configuration based on the format, and means for performing the wireless communication during the first symbol in accordance with the slot configuration.

A non-transitory computer-readable medium storing code for wireless communication at a base station is described. The code may include instructions executable by a processor to identify a format of a slot including a set of symbols, where the format indicates that a first portion of a first symbol of the set of symbols includes at least two cyclic prefixes and a second portion of the first symbol includes a guard interval, transmit, to a UE, control signaling indicating a slot configuration based on the format, and perform the wireless communication during the first symbol in accordance with the slot configuration.

Some examples of the method, apparatuses, and non-transitory computer-readable medium described herein may further include operations, features, means, or instructions for performing the wireless communication during a second symbol of the set of symbols, the first symbol and the second symbol may be contiguous in a time domain and where the format indicates that the second symbol includes a second guard interval, and the at least two cyclic prefixes in the first symbol may be based on the second symbol.

In some examples of the method, apparatuses, and non-transitory computer-readable medium described herein, a first DFT size for the first symbol may be the same as a second DFT size for the second symbol.

Some examples of the method, apparatuses, and non-transitory computer-readable medium described herein may further include operations, features, means, or instructions for transmitting the control signaling based on one or more of a beam switch operation or a resource allocation operation, the control signaling enabling the format for the slot and indicating use of the at least two cyclic prefixes.

Some examples of the method, apparatuses, and non-transitory computer-readable medium described herein may further include operations, features, means, or instructions for performing a beam switch operation during one or more of the at least two cyclic prefixes based on the slot configuration.

Some examples of the method, apparatuses, and non-transitory computer-readable medium described herein may further include operations, features, means, or instructions for receiving the wireless communication via one or more of the at least two cyclic prefixes, where the wireless communication may be based on one or more of a delay spread satisfying a threshold or an absence of a beam switch.

In some examples of the method, apparatuses, and non-transitory computer-readable medium described herein, the control signaling indicates a first configuration for a first subset of symbols of the set of symbols, the first subset of symbols including the first symbol and one or more second symbols.

Some examples of the method, apparatuses, and non-transitory computer-readable medium described herein may further include operations, features, means, or instructions for determining a second format for a second subset of symbols of the set of symbols, transmitting, to the UE, an indication identifying a second configuration for the second subset of symbols based on the second format, and performing the wireless communication during the second subset of symbols in accordance with the second format.

Some examples of the method, apparatuses, and non-transitory computer-readable medium described herein may further include operations, features, means, or instructions for determining a periodicity based on the slot configuration and performing the wireless communication during one or more of the first symbol and a second symbol in the slot based on the periodicity, the second symbol including at least two respective cyclic prefixes and a respective guard interval.

In some examples of the method, apparatuses, and non-transitory computer-readable medium described herein, transmitting the control signaling may include operations, features, means, or instructions for transmitting an RRC message including the slot configuration.

In some examples of the method, apparatuses, and non-transitory computer-readable medium described herein, transmitting the control signaling may include operations, features, means, or instructions for transmitting one or more of an RRC message, a DCI, or a MAC-CE indicating the slot configuration.

In some examples of the method, apparatuses, and non-transitory computer-readable medium described herein, the set of symbols, the at least two cyclic prefixes, and a set of multiple guard intervals corresponding to the set of symbols may be within boundaries of the slot.

In some examples of the method, apparatuses, and non-transitory computer-readable medium described herein, the wireless communication includes a single carrier waveform.

DETAILED DESCRIPTION

Figure 1:
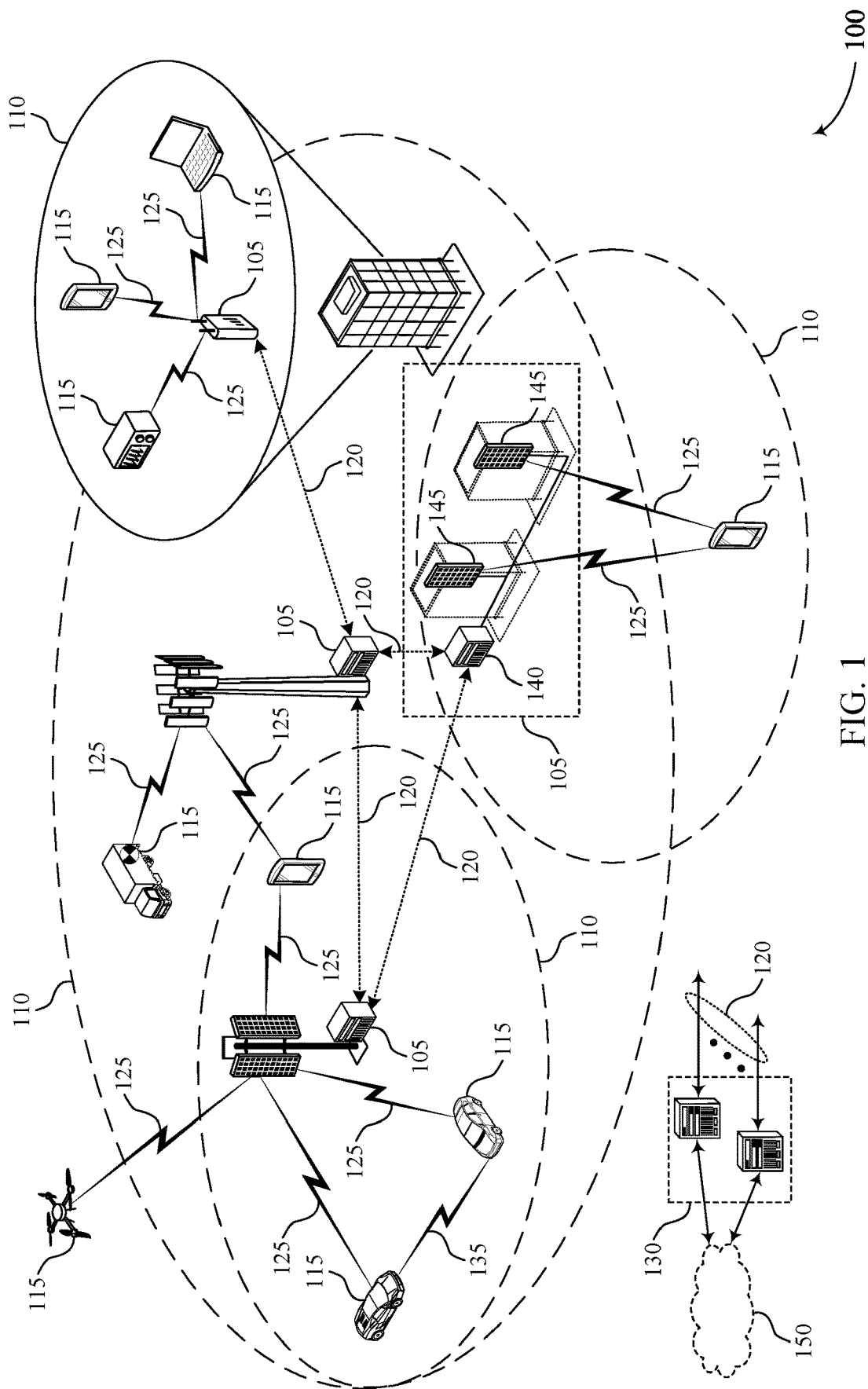
FIGS. 1 and 2 illustrate examples of wireless communications systems that support techniques for a combined cyclic prefix and guard interval-based waveform in accordance with aspects of the present disclosure.

A wireless communications system may include communication devices, such as a base station (e.g., an eNodeB (eNB), a next-generation NodeB or a giga-NodeB, any of which may be referred to as a gNB, or some other base station) or a UE that may support multiple radio access technologies. Examples of radio access technologies include 4G systems, such as LTE systems, and 5G systems, which may be referred to as NR systems. In the wireless communications system, the communication devices may support beamformed wireless communication. In some cases, the communication devices may support the beamformed wireless communication using a waveform via symbols in one or more slots according to a cyclic prefix-based or a guard interval-based format. In some cases, the communication devices may perform a beam switch operation during a duration that is longer than a cyclic prefix. However, allocating an extended cyclic prefix in each symbol or allocating a symbol duration for the beam switch operation may increase overhead and reduce efficiency. A guard interval-based format may provide for more efficient utilization of communication resources than a cyclic prefix-based format, but may not be self-contained within a slot. For example, a guard interval for a first symbol in each slot may be located in a prior slot in the time domain, which may reduce reliability and increase latency.

The communication devices as described herein may communicate using a combined cyclic prefix and guard interval-based format to support efficient utilization of resources, reduced latency, and improved reliability as compared with cyclic prefix-based formats or guard interval-based formats. The combined cyclic prefix and guard interval-based format may include a cyclic prefix symbol concatenated with one or more (e.g., N−1) guard interval symbols to achieve an extended cyclic prefix length (e.g., N*cyclic prefix length) for a slot-contained waveform. A base station may transmit control signaling to a UE to indicate a slot configuration. The UE may determine a combined cyclic prefix and guard interval-based format for a set of symbols in the slot based on the slot configuration.

The combined cyclic prefix and guard interval-based format may indicate that a first portion (e.g., a beginning portion) of a first symbol may include at least two cyclic prefixes and a second portion (e.g., an ending portion) of the first symbol may include a guard interval. The format may indicate a quantity of one or more subsequent symbols in the slot that may each include a guard interval. A quantity of the cyclic prefixes in the first symbol may be based on the quantity of subsequent symbols in the slot that each include a guard interval. The cyclic prefix and guard interval-based waveform may be self-contained within slot boundaries, and the extended cyclic prefix length may provide for the UE, the base station, or both to perform a beam switch operation, to transmit defined signaling, or to perform other operations.

Aspects of the disclosure are initially described in the context of wireless communications systems. Additional aspects of the disclosure are described with reference to slot formats, combined slot formats, and process flows. Aspects of the disclosure are further illustrated by and described with reference to apparatus diagrams, system diagrams, and flowcharts that relate to techniques for a combined cyclic prefix and guard interval-based waveform.

FIG. 1 illustrates an example of a wireless communications system that supports techniques for a combined cyclic prefix and guard interval-based waveform in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a respective bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a respective carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at different orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a respective receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a base station 105 and a UE 115 may communicate across one or more TTIs, such as slots, according to a cyclic prefix-based and guard interval-based format. The base station 105 may transmit control signaling to the UE 115 to indicate a slot configuration. The UE 115 may identify a format of a slot based on the control signaling. The format may indicate that a first portion (e.g., a beginning portion) of a first symbol in the slot includes at least two cyclic prefixes and a second portion (e.g., an ending portion) of the first symbol includes a guard interval. The format may additionally indicate that one or more second symbols subsequent to the first symbol in the slot each include a respective guard interval. In some examples, a quantity of cyclic prefixes in the first symbol may be based on a quantity of the one or more second symbols that each include a guard interval. The base station 105 and the UE 115 may perform wireless communications via the first symbol and the one or more second symbols in accordance with the identified format. That is, the base station 105 and the UE 115 may communicate according to a combined cyclic prefix and guard interval-based waveform that may be transmitted via a cyclic prefix symbol concatenated with at least one guard interval symbol.

Figure 2:
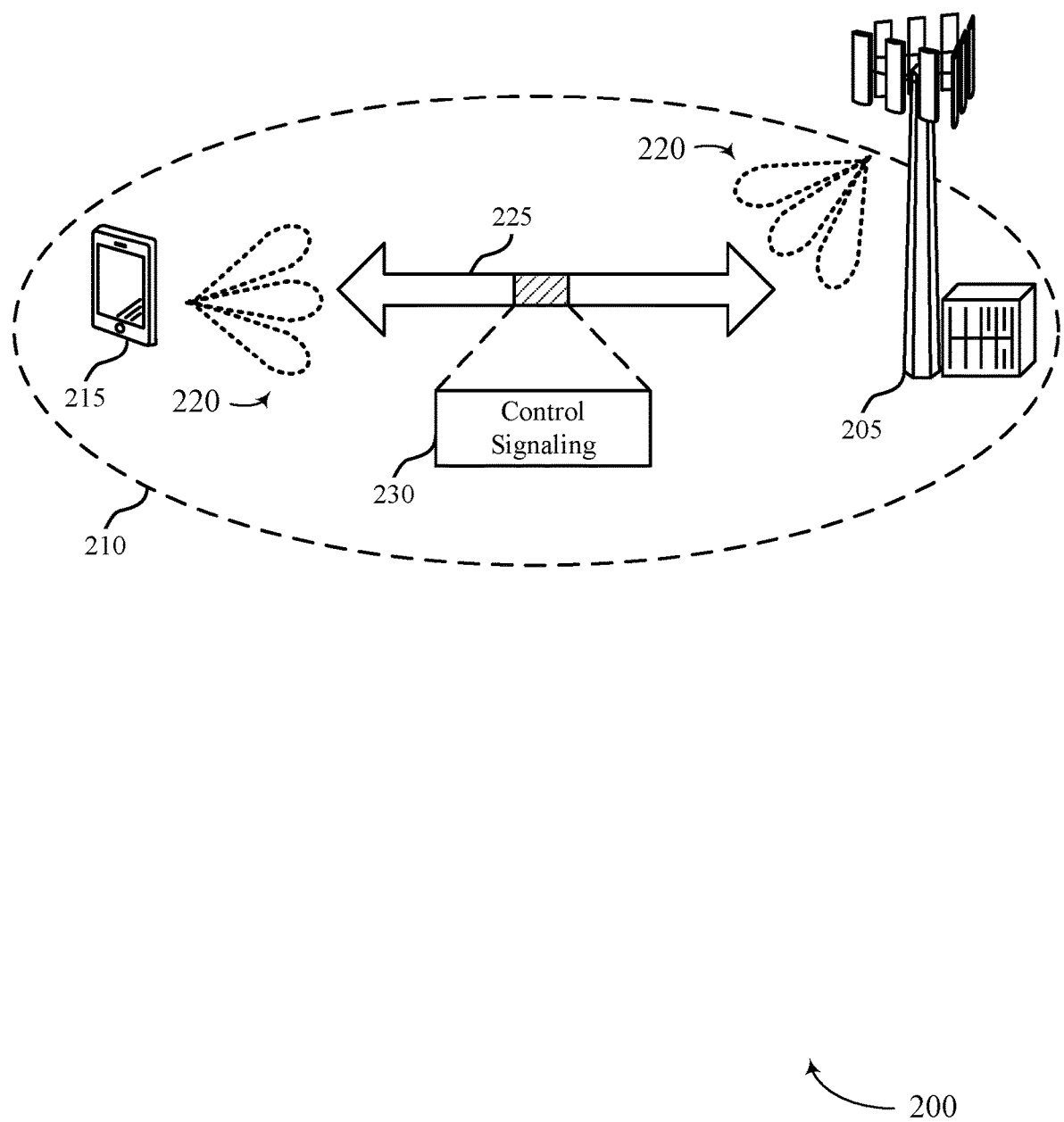

FIG. 2 illustrates an example of a wireless communications system 200 that supports techniques for a combined cyclic prefix and guard interval-based waveform in accordance with aspects of the present disclosure. The wireless communications system 200 may implement aspects of the wireless communications system 100 or may be implemented by aspects of the wireless communications system 100 as described with reference to FIG. 1. For example, the wireless communications system 200 may include a base station 205 and a UE 215, which may represent examples of a base station 105 and a UE 115 as described with reference to FIG. 1. The base station 205 and the UE 215 may communicate within a geographic coverage area 210 and via a communication link 225. In some examples, the base station 205 may transmit control signaling 230 to the UE 215 to indicate a slot configuration.

The UE 215 and the base station 205 may communicate on one or more frequency bands that support a bandwidth (e.g., one or more frequency bands, such as FR2X or FR4 may support more spectrum availability than FR1, FR2, or other frequency bands). In some cases, a respective subcarrier spacing (SCS) numerology may be supported by such operating bandwidths (e.g., a 960 kilohertz (kHz) SCS, or larger). The base station 205 and the UE 215 may communicate using one or more waveforms, such as single carrier waveforms, multi-carrier waveforms, or both, in accordance with the SCS. For example, the base station 205 and the UE 215 may communicate via a cyclic prefix-based waveform or a guard interval-based waveform. Details of the cyclic prefix and guard interval-based waveforms are described in further detail elsewhere herein, including with reference to FIG. 3.

A duration of cyclic prefixes and symbols in a cyclic prefix-based waveform (e.g., a single carrier OFDM waveform) may be inversely proportional to the SCS. That is, as the SCS increases, a duration of each cyclic prefix and each symbol may decrease. In one example, a symbol duration may be around 1.1 microseconds (us) at 960 kHz SCS and a cyclic prefix length (which may be referred to as a normal cyclic prefix length) may be 73 nanoseconds (ns) at 960 kHz SCS, which may be shorter than a cyclic prefix length at lower SCS numerologies.

The base station 205 and the UE 215 may communicate with each other using a set of beams 220, which may include one or more uplink beams or one or more downlink beams, or any combination thereof. One or more of the base station 205 or the UE 215 may perform beamforming by switching between beams during communications. In some cases, a beam switch operation may be performed during a cyclic prefix duration. For relatively high SCS numerologies, however, a cyclic prefix duration may be shorter than a beam switch duration (e.g., a beam switch operation may occupy around 100 ns, or some other duration that may be longer than a cyclic prefix length). In such cases, a symbol duration may be allocated for the beam switch operation. The symbol duration may be longer than the beam switch during (e.g., a symbol duration may be 1 us longer than the beam switch duration, or more), which may reduce efficiency. Additionally or alternatively, a cyclic prefix length may be extended to support the beam switch operation. However, using an extended cyclic prefix for each symbol in a waveform, or introducing a non-uniform cyclic prefix, may increase system overhead or complicate a receiver implementation. As such, beam switch operations may incur relatively large latency for communications according to cyclic prefix-based waveforms.

For some time domain waveforms, such as DFT-s-OFDM or single carrier quadrature amplitude modulation (QAM) waveforms, either cyclic prefixes or guard intervals may be utilized. The guard interval-based single carrier waveform may be more efficient than the cyclic prefix-based single carrier waveform because the guard interval may be utilized for signaling, whereas a cyclic prefix may include a portion of random data (e.g., discarded by the receiver). However, a guard interval-based single carrier waveform may not be self-contained within a symbol and/or slot, which may reduce reliability and increase latency associated with communications, as described in more detail with reference to FIG. 3.

A combined cyclic prefix and guard interval-based waveform as described herein may support increased efficiency, reduced latency, and reduced overhead as compared with the cyclic prefix-based waveform and the guard interval-based waveform. The base station 205 may transmit the control signaling 230 to the UE 215 to indicate a configuration for a slot. The control signaling 230 may be an RRC message (e.g., a semi-static configuration), a MAC control element (MAC-CE), downlink control information (DCI), or some other control signaling 230 that indicates a slot configuration in accordance with the combined waveform format.

The UE 215 may receive the control signaling 230 and determine a format for a slot based on the control signaling 230 and the indicated slot configuration. The slot may include a set of symbols for conveying a single carrier waveform. The format for the slot may indicate that a beginning portion of a first symbol in the slot (which may be referred to as a cyclic prefix symbol) may include two or more cyclic prefixes and an ending portion of the first symbol may include a guard interval. The slot format may indicate that remaining symbols (which may be referred to as guard interval symbols) in the slot may each include a respective guard interval. A quantity of cyclic prefixes (e.g., N cyclic prefixes) in the first symbol may be based on a quantity of the remaining symbols (e.g., N−1 guard interval symbols). In other words, by concatenating a cyclic prefix symbol together with one or more guard interval symbols, the UE 215 and the base station 205 may communicate via a waveform that is self-contained within a slot, includes a same quantity of symbols within a slot as a normal cyclic prefix-based waveform, and supports an extended cyclic prefix length.

The extended cyclic prefix length may be utilized for beam switch operations or other operations. For example, the first symbol may include multiple cyclic prefix durations, which when combined may be longer than the beam switch duration (e.g., a cyclic prefix duration in the first symbol may be a quantity, N, of cyclic prefixes multiplied by a cyclic prefix length for a configured SCS). If a beam switch operation is not performed during the combined cyclic prefixes, a known signal may be transmitted. The control signaling 230 may, in some examples, indicate a format for each slot and an intended use for the extra cyclic prefixes, if any, in the slot.

In the wireless communications system 200, the base station 205 and the UE 215 may thereby support a combined cyclic prefix and guard interval-based waveform to provide for reduced latency, improved efficiency, and to support operations such as beam switching or transmission of synchronization signaling.

Figure 3:
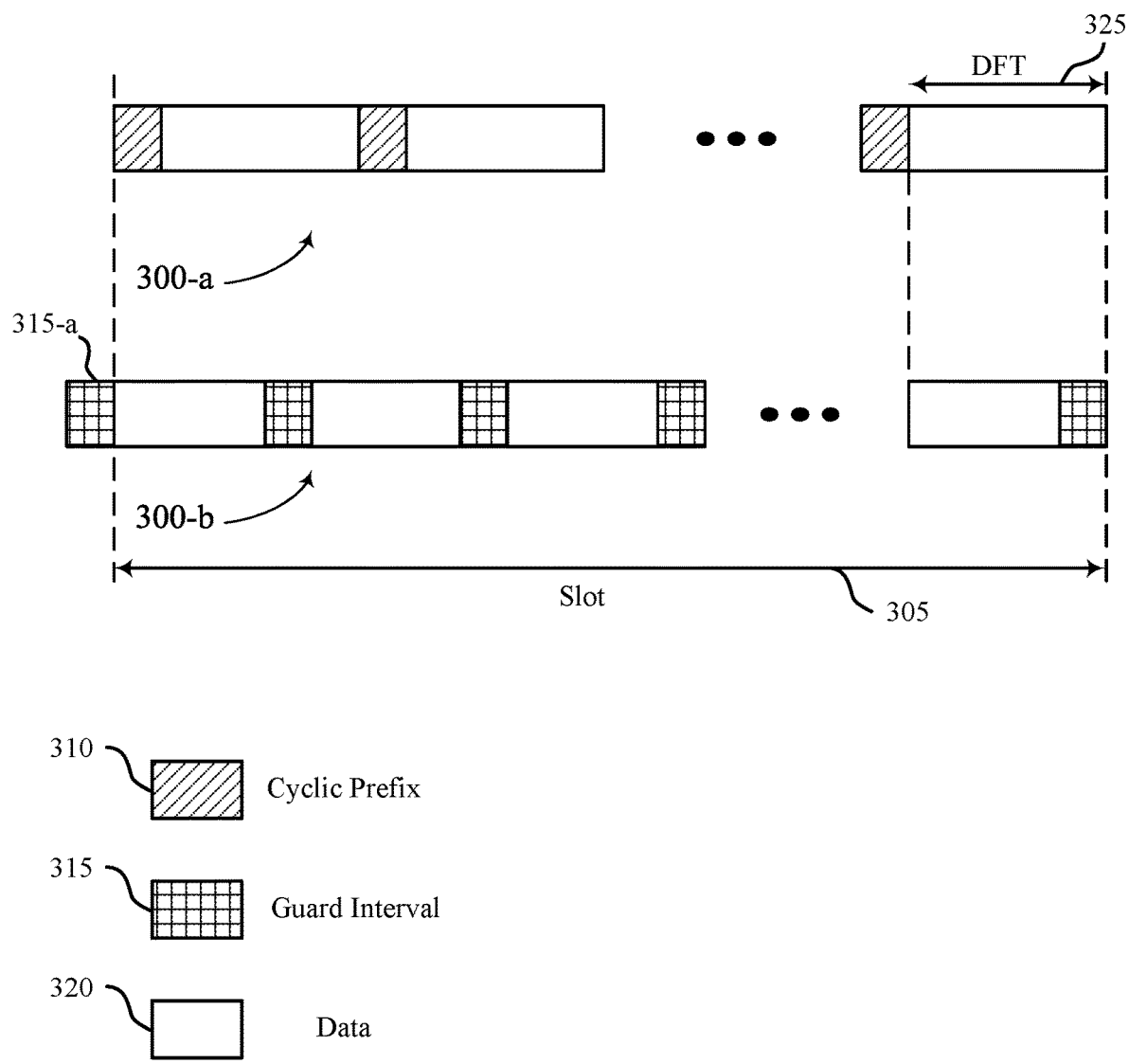
FIG. 3 illustrates examples of slot formats that support techniques for a combined cyclic prefix and guard interval-based waveform in accordance with aspects of the present disclosure.

FIG. 3 illustrates examples of a slot format 300-a and a slot format 300-b that support techniques for a combined cyclic prefix and guard interval-based waveform in accordance with aspects of the present disclosure. The slot format 300-a and the slot format 300-b may represent example configurations of a slot 305 for communications between a base station 105 and a UE 115. The base station 105 and the UE 115 may represent examples of a base station and a UE as described with reference to FIGS. 1 and 2.

The slot format 300-a may represent an example of a cyclic prefix-based slot format and the slot format 300-b may represent an example of a guard interval-based slot format. The cyclic prefixes 310 or the guard intervals 315 may be included in waveforms used for communications between the base station 105 and the UE 115 to convert a linear convolution of the transmitted symbols in a slot 305 to a circular convolution with the channel such that a receiving device may perform a one-tap frequency domain equalization (FDE) procedure. Additionally or alternatively, the cyclic prefixes 310 or the guard intervals 315 may reduce inter-symbol interference and maintain alignment between symbols and slots 305 (e.g., alignment between different types of waveforms). For example, if a first device transmits both a single carrier waveform and an OFDM waveform (e.g., in a spatial division multiplexing (SDM) fashion), a second device may receive both waveforms simultaneously, and the cyclic prefixes 310 or the guard intervals 315 included in each waveform may provide for symbol or slot level alignment between the two received waveforms.

In accordance with the slot format 300-*a*, each symbol in the slot 305 may include data 320 and a cyclic prefix 310. Each cyclic prefix 310 may be pre-appended to a beginning of a symbol and may include a repetition of one or more samples of an ending portion of the respective symbol. In other words, the cyclic prefixes 310 may include random data that may be discarded by a receiving device. Each cyclic prefix 310 and symbol may be included within the boundaries of the slot 305, such that a cyclic prefix-based waveform transmitted in accordance with the slot format 300-*a* may be referred to as a slot-contained waveform.

If a first (e.g., normal) cyclic prefix duration is configured for each symbol, the slot 305 may contain 14 symbols. If an extended cyclic prefix duration is configured for each symbol, the slot 305 may include 12 symbols. In some cases, one or a subset of cyclic prefixes 310 in a slot 305 may include a duration that is different from remaining cyclic prefixes 310 in the slot 305. Such a non-uniform cyclic prefix configuration may reduce reliability, increase overhead, and increase processing by the receiving device. In the example of the slot format 300-*a*, each symbol may include a cyclic prefix 310 having a same duration.

A duration of each cyclic prefix 310 is a function of an SCS configured for communications between the UE 115 and the base station 105. As the SCS increases, a duration of each cyclic prefix 310 decreases. The relationship between cyclic prefix duration and SCS numerology may provide for decreased adaptability to delay spread. That is, if the channel is subject to delay spread, the slot format 300-*a* may not adapt as easily as other slot formats 300. Additionally or alternatively, if a beam switch operation is to be performed by the UE 115 or the base station 105 during the slot 305, adjusting a duration of a cyclic prefix 310 to provide time for the beam switch operation may result in increased overhead and latency.

A receiver may perform a DFT operation for each symbol in the slot 305 during a DFT window 325. Each symbol within the slot 305 may correspond to a fixed DFT size. That is, each DFT window 325 may be the same duration. Each cyclic prefix 310 may not be included in the DFT window 325. The receiver may process the data 320 during the DFT window 325 for each symbol, and the receiver may refrain from processing the cyclic prefixes 310 using DFT.

The slot format 300-*b* (which may be a guard interval-based format) may provide for more symbols to be included in the slot 305 than the slot format 300-*a* (which may be a cyclic prefix-based format), which may increase spectral efficiency (e.g., 15 OFDM symbols may be included in each slot 305 if a length of each guard interval 315 in the slot 305 is the same as a length of a normal cyclic prefix 310). The DFT window 325 for the slot format 300-*b* may be a same duration or a different duration than the DFT window 325 for the slot format 300-*a*. The DFT window 325 may include a respective guard interval 315. That is, each guard interval 315 may be processed by the receiver using DFT. Each guard interval 315 may include a known sequence of data. For example, a guard interval 315 may be utilized for time or frequency synchronization, channel estimation, phase tracking, or transmission of other signaling. The guard intervals 315 may be adjusted to adapt to delay spreads without changing symbol durations. Additionally or alternatively, a duration of a guard interval 315 may be adjusted to support a beam switch operation.

In accordance with the guard interval-based slot format 300-*b*, each symbol in the slot 305 may include data 320 and a guard interval 315. An additional guard interval 315-*a* may be appended prior to a first symbol in the slot 305. That is, the slot format 300-*b* may not be slot-contained because the guard interval 315-*a* may not be included in the slot 305. The guard interval 315-*a* may not be used if the slot 305 is a first slot 305 being received by the receiving device, or if a slot prior to the slot 305 does not include data traffic. If the guard interval 315-*a* cannot be used for decoding the first symbol in the slot 305, the first symbol may not be decoded, or may not be decoded efficiently, which may reduce reliability and increase latency.

A combined cyclic prefix and guard interval-based waveform as described herein may provide for a slot-contained format while maintaining a same quantity of symbols per slot 305 as the slot format 300-*a*. Such a combined waveform format may provide for a longer cyclic prefix duration in a first symbol, while supporting transmission of known data sequences via guard intervals 315 in remaining symbols, increasing communication reliability, increasing efficiency, and reducing latency as compared with one or both of the slot format 300-*a* and the slot format 300-*b*. Details of the combined waveform format are described in further detail elsewhere herein, including with reference to FIGS. 4 through 6.

Figure 4:
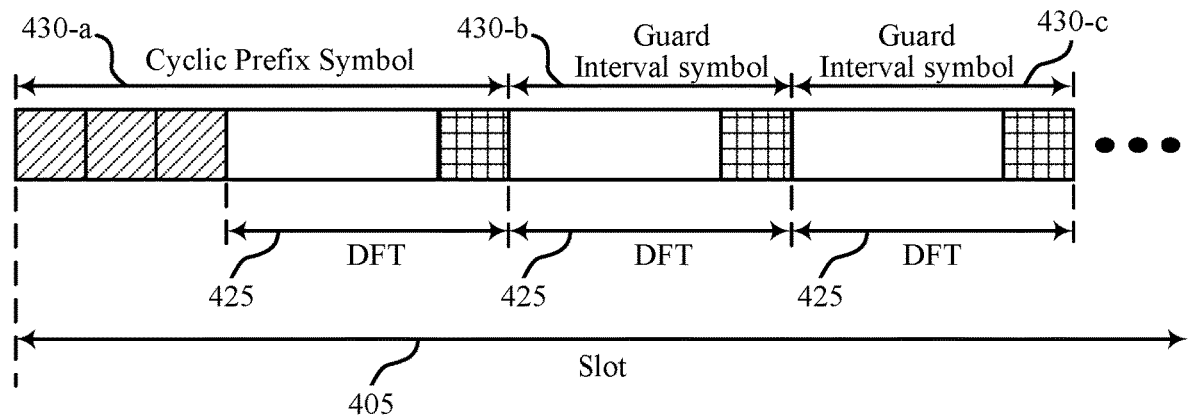
FIGS. 4 and 5 illustrate examples of combined slot formats that support techniques for a combined cyclic prefix and guard interval-based waveform in accordance with aspects of the present disclosure.
Figure 4:
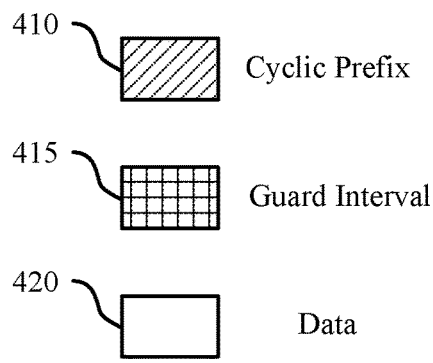

FIG. 4 illustrates an example of a combined slot format 400 that supports techniques for a combined cyclic prefix and guard interval-based waveform in accordance with aspects of the present disclosure. The combined slot format 400 may represent an example configuration of a waveform within a slot 405 for communications between a base station 105 and a UE 115. The base station 105 and the UE 115 may represent examples of a base station and a UE as described with reference to FIGS. 1 through 3. The slot 405 may include multiple symbols 430, which may be cyclic prefix symbols or guard interval symbols in accordance with the combined slot format 400.

As described with reference to FIG. 2, the base station 105 may transmit control signaling to the UE 115 to indicate a configuration for the slot 405. The UE 115 may determine the combined slot format 400 for the slot 405 based on the configuration. The combined slot format 400 may indicate that a first symbol 430-*a* in the slot 405 is a cyclic prefix symbol and one or more other symbols 430, such as the symbols 430-*b* and 430-*c*, are guard interval symbols. That is, the format may indicate that a beginning portion of the symbol 430-*a* includes two or more cyclic prefixes 410 (e.g., three cyclic prefixes 410 in the example of FIG. 4), an ending portion of the symbol 430-*a* includes a guard interval 415, and one or more other symbols 430 in the slot 405 each include a respective guard interval 415. In some examples, a size of the data 420 (e.g., a payload size) in the symbol 430-*a* may be smaller than a size of the data 420 in other symbols 430 in the slot 405.

The quantity of cyclic prefixes 410 in the symbol 430-*a* may be based on a quantity of the one or more other symbols 430 (e.g., symbols 430 that each include a single guard interval 415). For example, a symbol 430 that includes a number, N, of cyclic prefixes 410 may be concatenated with one fewer than the number (N−1) of symbols 430 that each include a guard interval 415 to form a combined cyclic prefix and guard interval-based waveform that is slot-contained and includes a same quantity of symbols 430 per slot 405 as a cyclic prefix-based waveform (e.g., 14 OFDM symbols). The combined waveform may thereby allocate additional cyclic prefix length (e.g., N*cyclic prefix length) in the symbol 430-*a* (e.g., a cyclic prefix symbol) because each other symbol 430 in the slot 405 (e.g., each guard interval symbol) leverages a guard interval 415 in a previous symbol 430.

Each cyclic prefix 410 in the symbol 430-*a* may include the same contents (e.g., the cyclic prefixes 410 may be copies of each other) such that the channel structure is circular. Each cyclic prefix 410 may include repetition of one or more samples from an ending portion of the symbol 430-*a*. For example, the cyclic prefixes 410 may each include some or all of the guard interval 415 at the ending portion of the symbol 430-*a*, one or more samples of the data 420 at the ending portion of the symbol 430-*a*, or both. In one example, the guard interval 415 at the ending portion of the symbol 430-*a* may include some quantity, K, of samples and each cyclic prefix 410 may include three times as many samples (e.g., 3(K) samples). Each cyclic prefix 410 may thereby include samples from the guard interval 415 and two times as many samples (e.g., 2(K) samples) from an ending portion of the data 420 in the symbol 430-*a*.

The base station 105 may transmit control signaling to the UE 115 to indicate a configuration for the slot 405, as described with reference to FIG. 2. The UE 115 may determine, based on the configuration, a format for the slot 405 that includes the symbol 430-*a*, the symbols 430-*b* and 430-*c*, and one or more other symbols 430 (not pictured in FIG. 4). The control signaling may enable the combined format for the slot 405 and indicate a duration and a trigger for the combined format, such as an intended use of the two or more cyclic prefixes 410 in the symbol 430-*a* (e.g., a beam switch operation, transmission of a defined signal, or some other operation to be performed during the cyclic prefixes 410).

In some examples, the base station 105 may indicate a combined cyclic prefix and guard interval-based format for the slot 405 and each other slot used by the UE 115 and the base station 105 for communications. In one example, the control signaling may be semi-static control signaling, such as RRC signaling, that may indicate a configured periodicity or static configuration for multiple slots 405. Additionally or alternatively, the base station 105 may dynamically enable the combined cyclic prefix and guard interval-based structure when relatively large cyclic prefix overhead is needed (e.g., for a beam switching operation), when a resource allocation operation is performed (e.g., a guard interval 415 in a previous slot 405 may not be used due to the change in resource allocation), or both. For example, the control signaling may be RRC, DCI, a MAC-CE, or uplink control information (UCI) that enables the combined format. The base station 105 may enable the combined format for the slot 405 to provide time for a beam switch operation to be performed during the slot 405, or to support a switch between resource allocations (e.g., a switch between higher payload traffic, such as physical downlink shared channel (PDSCH) traffic, and lower payload traffic, such as physical downlink control channel (PDCCH) traffic).

Although the first symbol 430-*a* in the slot 405 is illustrated as a cyclic prefix symbol in FIG. 4, it is to be understood that two or more cyclic prefixes 410 may be configured in any symbol 430 of the slot 405. That is, the combined cyclic prefix and guard interval structure may start at any symbol 430 in the slot 405. In some examples, different UEs 115 may start the combined structure at different symbols 430. The control signaling may indicate a starting symbol 430 for the combined structure.

The base station 105 may define a uniform grid for configuring the combined waveform format. The uniform grid may provide for the base station 105 to indicate the combined format and a starting symbol(s) 430 for the combined format while maintaining alignment between slot boundaries, symbols 430, and DFT windows 425. The base station 105 may define a set of one or more grids, and each grid may include a different quantity of symbols 430. For example, each grid may include N symbols 430 (e.g., one cyclic prefix symbol and N−1 guard interval symbols). By utilizing the grid structure, the base station 105 may indicate a periodic allocation of resources such that the UE 115 and/or the base station 105 may perform a beam switch operation, a resource assignment operation, or both, every N symbols 430. The UE 115 and the base station 105 may refrain from allocating a symbol-length gap for performing beam switching or inserting an initial guard interval 415 in a different slot.

Each slot 405 may include one or more grids. The grids may be contained within slot boundaries. If a slot 405 cannot be divided uniformly into multiple grids, one or more grids may include more or less symbols 430 than the other grids. In one example, the base station 105 may define a grid to include three symbols 430. In such cases, two grids in a slot 405 may include four symbols 430 and remaining grids in the slot 405 may include three symbols 430, such that the grids may be included within slot boundaries.

A receiving device may perform DFT on the received waveform during uniform DFT windows 425. A size of each DFT window 425 for the slot 405 may be the same, as illustrated in FIG. 4. The receiving device may identify the DFT window 425 for each symbol 430 in accordance with the defined grids. That is, the control signaling may configure one or more grids for each slot 405, and the grids may indicate a location of each DFT window 425. The DFT window 425 may include data 420 and a corresponding guard interval 415 for each symbol 430. The extra cyclic prefixes 410 in the symbol 430-*a* may not be included in a DFT window 425. The receiving device may know where to identify and discard the cyclic prefixes 410 based on the control signaling.

If the control signaling enables the combined cyclic prefix and guard interval-based waveform format for the slot 405, and if the control signaling indicates there are three cyclic prefixes 410 in the symbol 430-*a* allocated for a beam switch operation, the UE 115, the base station 105, or both, will perform the beam switch operation during one or more of the cyclic prefixes 410. Additionally or alternatively, the control signaling may enable the combined cyclic prefix and guard interval-based waveform format for the slot 405, but may not indicate an intended operation to be performed during the cyclic prefixes 410. For example, the control signaling may enable a grid structure, and a beam switching operation may not be performed during one or more of the grids, or the control signaling may enable the combined format to support a resource allocation operation, or the duration of the cyclic prefixes 410 may absorb a delay spread of the channel, or any combination thereof. In such cases, a defined signal (e.g., a pre-defined sequence) may be transmitted during one or more of the cyclic prefixes 410. For example, the UE 115, the base station 105, or both may utilize the cyclic prefixes 410 to transmit signaling and improve channel estimation, frequency tracking, time or frequency synchronization, or other operations.

The combined cyclic prefix and guard interval-based slot format described herein may thereby improve communication reliability and reduce latency as compared with cyclic prefix-based formats or guard interval-based formats. In some examples, the combined slot format may be configured according to a grid structure, which may improve coordination between devices and provide for efficient utilization of communication resources. The UE 115, the base station 105, or both may utilize the extra cyclic prefix duration provided by the combined slot format 400 to perform a beam switch operation, transmit known signaling, or both.

Figure 5:
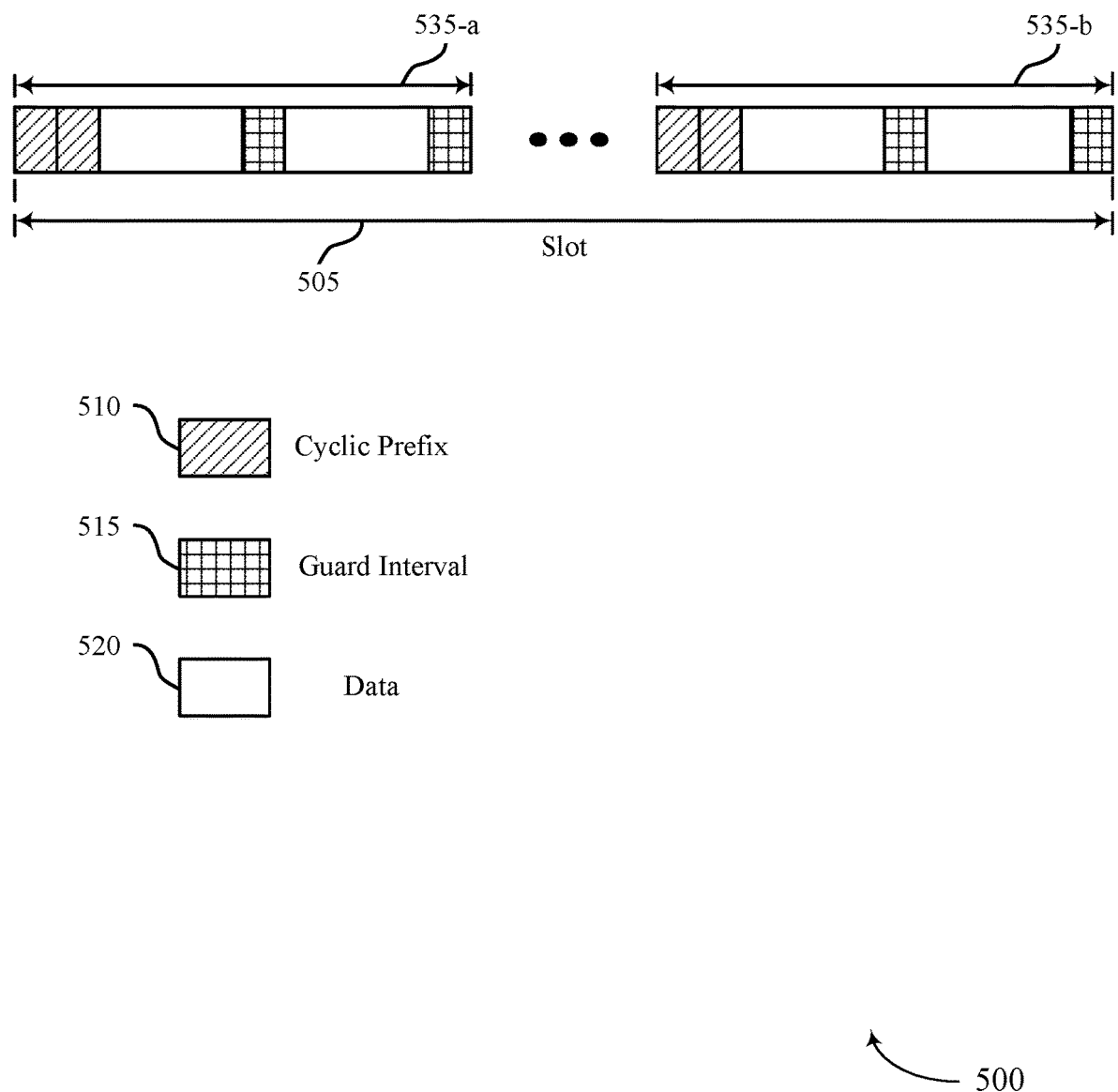

FIG. 5 illustrates an example of a combined slot format 500 that supports techniques for a combined cyclic prefix and guard interval-based waveform in accordance with aspects of the present disclosure. The combined slot format 500 may represent an example configuration of a waveform within a slot 505 for communications between a base station 105 and a UE 115. The combined slot format 500 may represent an example of the combined slot format 400 described with reference to FIG. 4. The base station 105 and the UE 115 may represent examples of a base station and a UE as described with reference to FIGS. 1 through 4. In some examples, the combined slot format 500 may be configured in accordance with one or more girds 535.

The slot 505 may include a quantity of symbols (e.g., 14 OFDM symbols). The symbols may be cyclic prefix-based symbols, guard interval-based symbols, or both based on a configured format for the slot 505, as described with reference to FIG. 4. In the example of FIG. 5, the slot 505 may include at least two grids 535 (e.g., grids 535-a and 535-b). Each grid 535 may include a cyclic prefix symbol concatenated with at least one guard interval symbol. The cyclic prefix symbol may include a quantity of cyclic prefixes 510 that is one more than a quantity of the guard interval symbols, as described with reference to FIG. 4. For example, the grids 535-a and 535-b may each include a cyclic prefix symbol that includes two cyclic prefixes 510 and a guard interval 515 and a single guard interval symbol that includes one guard interval 515. Although not pictured in FIG. 5, the slot 505 may additionally or alternatively include other grids 535 that may include some other quantity of symbols.

The base station 105 may transmit control signaling to the UE 115 to enable the combined cyclic prefix and guard interval structure for the grids 535-a and 535-b. In some examples, the control signaling may configure both grids 535-a and 535-b prior to the slot 505 (e.g., a static configuration). For example, the control signaling may indicate a quantity of grids 535 in the slot 505, a quantity of slots 505 that are associated with the combined structure, a periodicity associated with the grids 535, or any combination thereof. In some examples, the grid 535-b may follow a same structure or format as the grid 535-a. Additionally or alternatively, first control signaling may configure the grid 535-a and second control signaling may configure the grid 535-b. In some examples, the grid 535-a may include downlink data traffic and the grid 535-b may include uplink data traffic, or vice versa. For example, the slot 505 may be divided into mini-slots or subslots, and each grid 535 may correspond to a respective mini-slot and may be configured with respective control signaling.

Each grid 535 may correspond to a respective beam or resource assignment. For example, the control signaling may enable the combined cyclic prefix and guard interval format for the grid 535-a and indicate a beam switch operation is to be performed during the cyclic prefixes 510 in the grid 535-a. The UE 115 or the base station 105 may perform the beam switch operation during the extra cyclic prefixes 510 in the first symbol of the grid 535-a to switch to a new beam. The UE 115 and the base station 105 may communicate data 520 using the beam during one or more guard interval symbols in the remainder of the grid 535-a or in one or more other grids 535 of the slot 505. In one example, the control signaling may enable the combined cyclic prefix and guard interval format for the grid 535-b and indicate a second beam switch operation is to be performed during the cyclic prefixes 510 in the grid 535-b. The UE 115 or the base station 105 may perform the second beam switch operation during the cyclic prefixes 510 in the grid 535-b in accordance with the control signaling. Accordingly, the grid 535-a may correspond to a first beam and the grid 535-b may correspond to a second beam. Additionally or alternatively, each grid 535 may correspond to a different channel type or resource allocation.

The guard intervals 515 in the grid 535-b may be the same as or different from the guard intervals 515 in the grid 535-a based on implementation of the UE 115 or the base station 105. The guard intervals 515 may vary based on channel and payload types. For example, the grid 535-a may include a PDSCH, a PDCCH, a PUSCH, a PUCCH, or any combination thereof and the grid 535-b may include a different channel or combination of channels. The guard intervals 515 may thereby be different in each grid 535 based on the allocated channels and data traffic.

The base station 105 may thereby transmit control signaling to enable a combined cyclic prefix and guard interval-based slot format on a per-grid basis. The combined format may be enabled for each grid 535 based on a beam switch operation or a resource allocation operation, and the UE 115 and the base station 105 may communicate via one or more grids 535 in a slot 505 in accordance with the control signaling.

Figure 6:
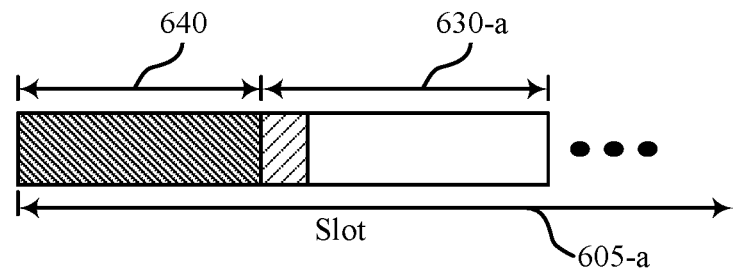
FIG. 6 illustrates examples of slot formats that support techniques for a combined cyclic prefix and guard interval-based waveform in accordance with aspects of the present disclosure.
Figure 6:
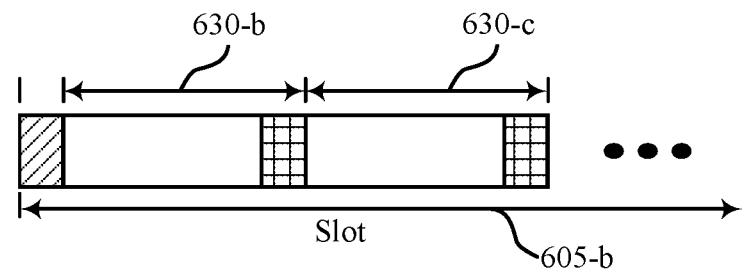
Figure 6:
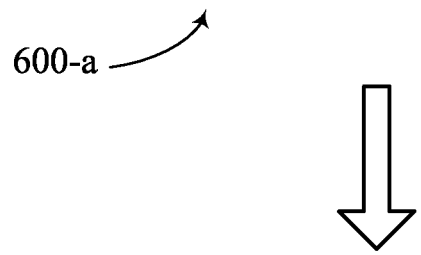

FIG. 6 illustrates examples of a slot format 600-a and a slot format 600-b that support techniques for a combined cyclic prefix and guard interval-based waveform in accordance with aspects of the present disclosure. The slot format 600-a and the slot format 600-b may represent an example configuration of a waveform within a slot 605 for communications between a base station 105 and a UE 115. The base station 105 and the UE 115 may represent examples of a base station and a UE as described with reference to FIGS. 1 through 5.

The slot format 600-a may be a cyclic prefix-based slot format, which may be an example of the slot format 300-a described with reference to FIG. 3. For example, the symbol 630-a and each other symbol 630 (not pictured) in the slot 605-a may include data 620 and a corresponding cyclic prefix 610. A cyclic prefix-based format, such as the slot format 600-a may result in mis-alignment between slots 605 over time. That is, a duration of 14 symbols 630 that include cyclic prefixes 610 may be slightly different from a duration of a slot 605. Over a time period, the difference in durations may increase to a relatively large offset between slot and symbol boundaries.

The offsets between a set of starting symbols 630 and respective slots 605 may be periodically concatenated into a single offset duration and allocated as an excess cyclic prefix duration 640, which may provide for re-alignment. The excess cyclic prefix duration 640 may, in some examples, include a cyclic prefix 610 having a longer duration than other cyclic prefixes 610 (e.g., an extended cyclic prefix for a first symbol every 0.5 ms, or some other periodicity). A length of the excess cyclic prefix duration 640 may be based on an SCS configured for communications between the UE 115 and the base station 105. Example excess cyclic prefix durations 640 for different SCS values are illustrated in Table 1.

TABLE 1

Extended Cyclic Prefix Durations

| SCS (kHz) | Slot Length (ms) | Cyclic Prefix of First Symbol Every 0.5 ms |
| --- | --- | --- |
| 15 | 1 | (144 + 16)k |
| 30 | 1/2 | (144 + 32)k |
| 60 | 1/4 | (144 + 64)k |
| 120 | 1/8 | (144 + 128)k |
| 960 | 1/64 | (144 + 1024)k |
| 1920 | 1/128 | (144 + 2048)k |
| 3840 | 1/256 | (144 + 4096)k |

As illustrated in Table 1, the length of a slot 605 decreases and the length of the excess cyclic prefix duration increases as the SCS increases. At 15 kHz SCS, the excess cyclic prefix duration 640 may be 160 k relative to a duration of a symbol 630, such as the symbol 630-a (e.g., an OFDM symbol length of 2048 k, or some other duration). At 3840 kHz SCS, the excess cyclic prefix duration 640 may be 4240 k relative to a duration of a symbol 630 (e.g., an OFDM symbol length of 2048 k). The excess cyclic prefix duration 640 may be included periodically across slots 605 based on the SCS. For example, the excess cyclic prefix duration 640 may be included twice in each slot 605 at 15 kHz SCS (e.g., in symbol 0 and symbol 7) and once every eight slots at 240 kHz SCS. In one example, the symbol 630-a and other symbols 630 in the slot 605 may include a cyclic prefix 610 having a duration of 144 k. It is to be understood that the durations provided with respect to Table 1 are examples, and any cyclic prefix duration may be configured for any SCS.

In some cases, the excess cyclic prefix duration 640 may be allocated as an additional symbol 630 in the slot 605 (not pictured in FIG. 6). However, the excess cyclic prefix duration 640 may not be long enough to include a corresponding cyclic prefix 610 for the additional symbol 630. For example, at 1920 kHz SCS, a cyclic prefix 610 for the first symbol every half millisecond includes a duration of 2192 k, the symbol duration may be 2048 k, and a cyclic prefix 610 on other symbols 630 may include a duration of 144 k. As such, there may not be sufficient time to include a symbol 630 and corresponding cyclic prefix 610 in the excess cyclic prefix duration 640. In some cases, no cyclic prefix 610 may be configured for the added symbol 630, or the excess cyclic prefix duration 640 may be re-distributed among one or more other symbols 630 in the slot 605. However, such techniques may result in performance loss or excessive delay spread for the channel.

The slot format 600-b may represent an example of a combined cyclic prefix and guard interval-based slot format as described herein. The combined cyclic prefix and guard interval-based slot format may be applied periodically (e.g., every 0.5 ms) to allocate the excess cyclic prefix duration 640 as an additional symbol 630-b and corresponding cyclic prefix 610. That is, by periodically configuring the combined cyclic prefix and guard interval-based slot format, an offset duration every half millisecond, or some other period, may include a symbol 630 and cyclic prefix 610. For example, the slot 605-b may include a cyclic prefix 610 appended to a symbol 630-a and a symbol 630-c (among other symbols 630) that includes a guard interval 615. The slot format 600-b may thereby support a combined cyclic prefix and guard interval-based waveform that may fit within boundaries of the slot 605-b and provide for alignment between symbols 630 and slots 605 over time.

Figure 7:
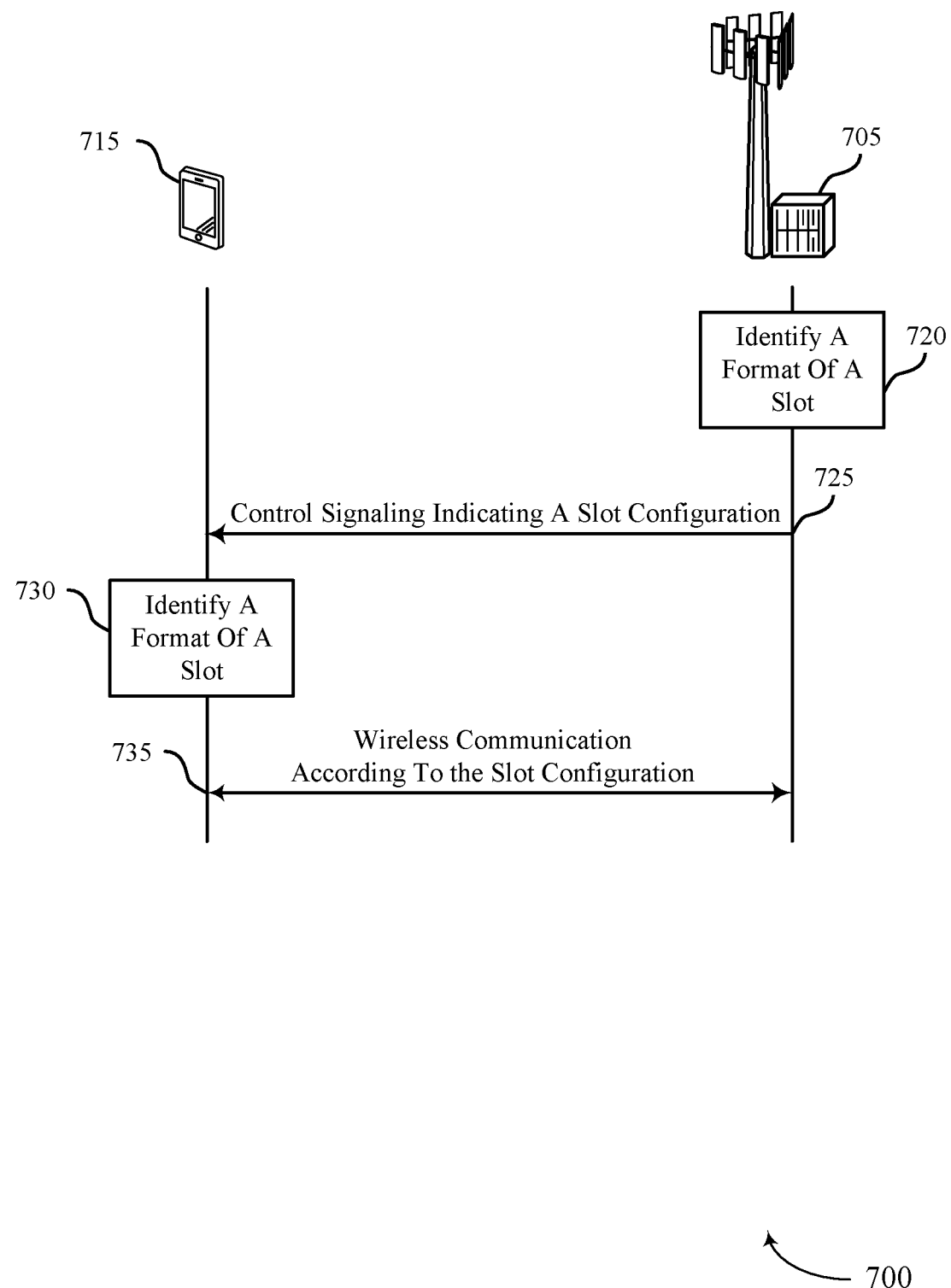
FIG. 7 illustrates an example of a process flow that supports techniques for a combined cyclic prefix and guard interval-based waveform in accordance with aspects of the present disclosure.

FIG. 7 illustrates an example of a process flow 700 that supports techniques for a combined cyclic prefix and guard interval-based waveform in accordance with aspects of the present disclosure. The process flow 700 may implement aspects of the wireless communications systems 100 and 200 or may be implemented by aspects of the wireless communications systems 100 and 200 as described with reference to FIGS. 1 and 2, respectively. For example, the process flow 700 may implement or be implemented by a base station 705 and a UE 715, which may be examples of a base station and a UE as described with reference to FIGS. 1 through 6. In the following description of the process flow 700, the operations between the base station 705 and the UE 715 may be performed in different orders or at different times. Some operations may also be left out of the process flow 700, or other operations may be added. Although the base station 705 and the UE 715 are shown performing the operations of the process flow 700, some aspects of some operations may also be performed by one or more other wireless devices.

At 720, the base station 705 may identify a format of a slot including a set of symbols. The format may indicate that a first portion of a first symbol of the set of symbols includes at least two cyclic prefixes and a second portion of the first symbol includes a guard interval. At 725, the base station 705 may transmit control signaling to the UE 715. The control signaling may indicate a slot configuration. In some examples, the slot configuration may be based on the format.

At 730, the UE 715 may identify a format of the slot including the set of symbols based on the slot configuration. The format may indicate that the first portion of the first symbol includes the at least two cyclic prefixes and the second portion of the first symbol includes the guard interval. In some examples, the format may indicate that a second symbol of the set of symbols includes a second guard interval. The second symbol may be contiguous in a time domain with the first symbol. In some examples, the at least two cyclic prefixes in the first symbol may be based on the second symbol. At 735, the UE 715 and the base station 705 may perform the wireless communication during the first symbol in accordance with the format. Performing the wireless communication may include the UE 715 or the base station 705 transmitting the wireless communication during the first symbol, the second symbol, and one or more other symbols of the set of symbols in the slot.

Figure 8:
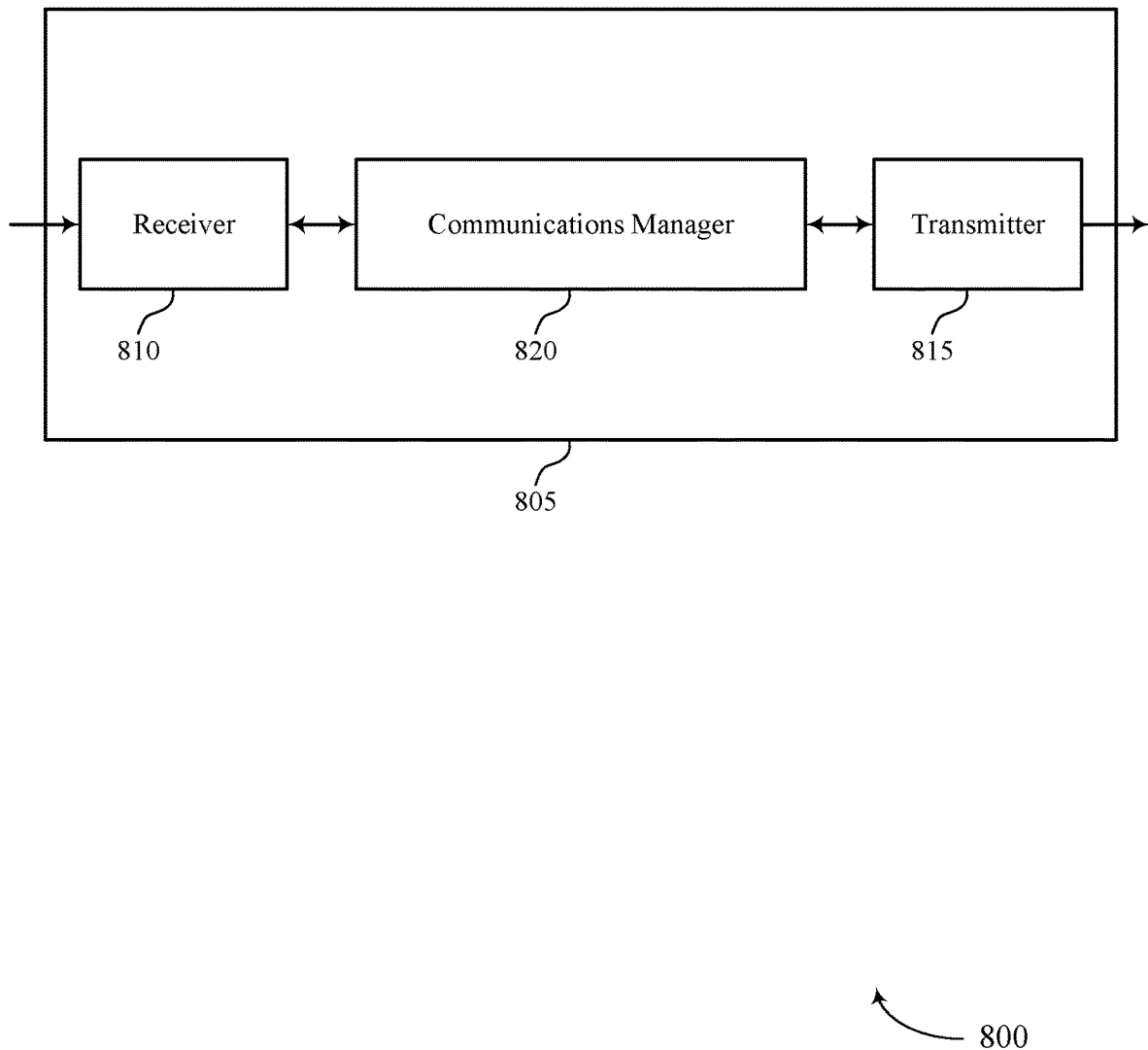
FIGS. 8 and 9 show block diagrams of devices that support techniques for a combined cyclic prefix and guard interval-based waveform in accordance with aspects of the present disclosure.

FIG. 8 shows a block diagram 800 of a device 805 that supports techniques for a combined cyclic prefix and guard interval-based waveform in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for a combined cyclic prefix and guard interval-based waveform). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for a combined cyclic prefix and guard interval-based waveform). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for a combined cyclic prefix and guard interval-based waveform as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving control signaling indicating a slot configuration. The communications manager 820 may be configured as or otherwise support a means for identifying a format of a slot including a set of symbols based on the slot configuration, where the format indicates that a first portion of a first symbol of the set of symbols includes at least two cyclic prefixes and a second portion of the first symbol includes a guard interval. The communications manager 820 may be configured as or otherwise support a means for performing the wireless communication during the first symbol in accordance with the format.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources. By supporting communications using to the combined cyclic prefix and guard interval-based waveform, the processor of the device 805 may transmit and receive known data via one or more guard intervals in the slot, which may reduce processing and power consumption as compared to random data that may be transmitted during cyclic prefixes in a cyclic prefix-based waveform. The combined format may provide for improved symbol and slot alignment between different waveforms, which may reduce processing. Additionally or alternatively, the combined format may provide for the processor of the device 805 to perform a beam switch operation or some other operation during at least two cyclic prefixes in first symbol of a slot, which may provide for more efficient utilization of communication resources than if the processor performs the operations during an extended cyclic prefix or a symbol duration.

Figure 9:
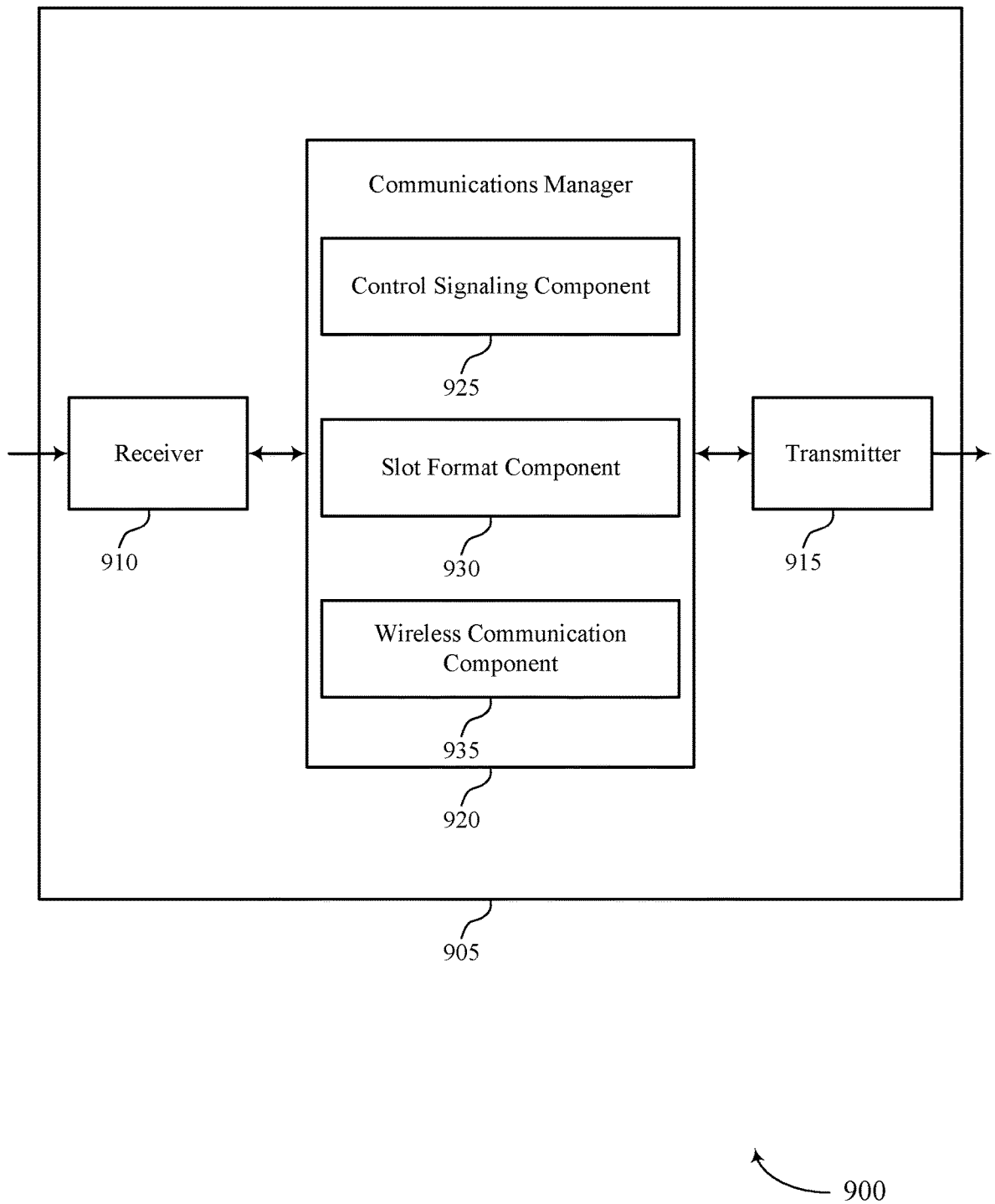

FIG. 9 shows a block diagram 900 of a device 905 that supports techniques for a combined cyclic prefix and guard interval-based waveform in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for a combined cyclic prefix and guard interval-based waveform). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for a combined cyclic prefix and guard interval-based waveform). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for a combined cyclic prefix and guard interval-based waveform as described herein. For example, the communications manager 920 may include a control signaling component 925, a slot format component 930, a wireless communication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The control signaling component 925 may be configured as or otherwise support a means for receiving control signaling indicating a slot configuration. The slot format component 930 may be configured as or otherwise support a means for identifying a format of a slot including a set of symbols based on the slot configuration, where the format indicates that a first portion of a first symbol of the set of symbols includes at least two cyclic prefixes and a second portion of the first symbol includes a guard interval. The wireless communication component 935 may be configured as or otherwise support a means for performing the wireless communication during the first symbol in accordance with the format.

Figure 10:
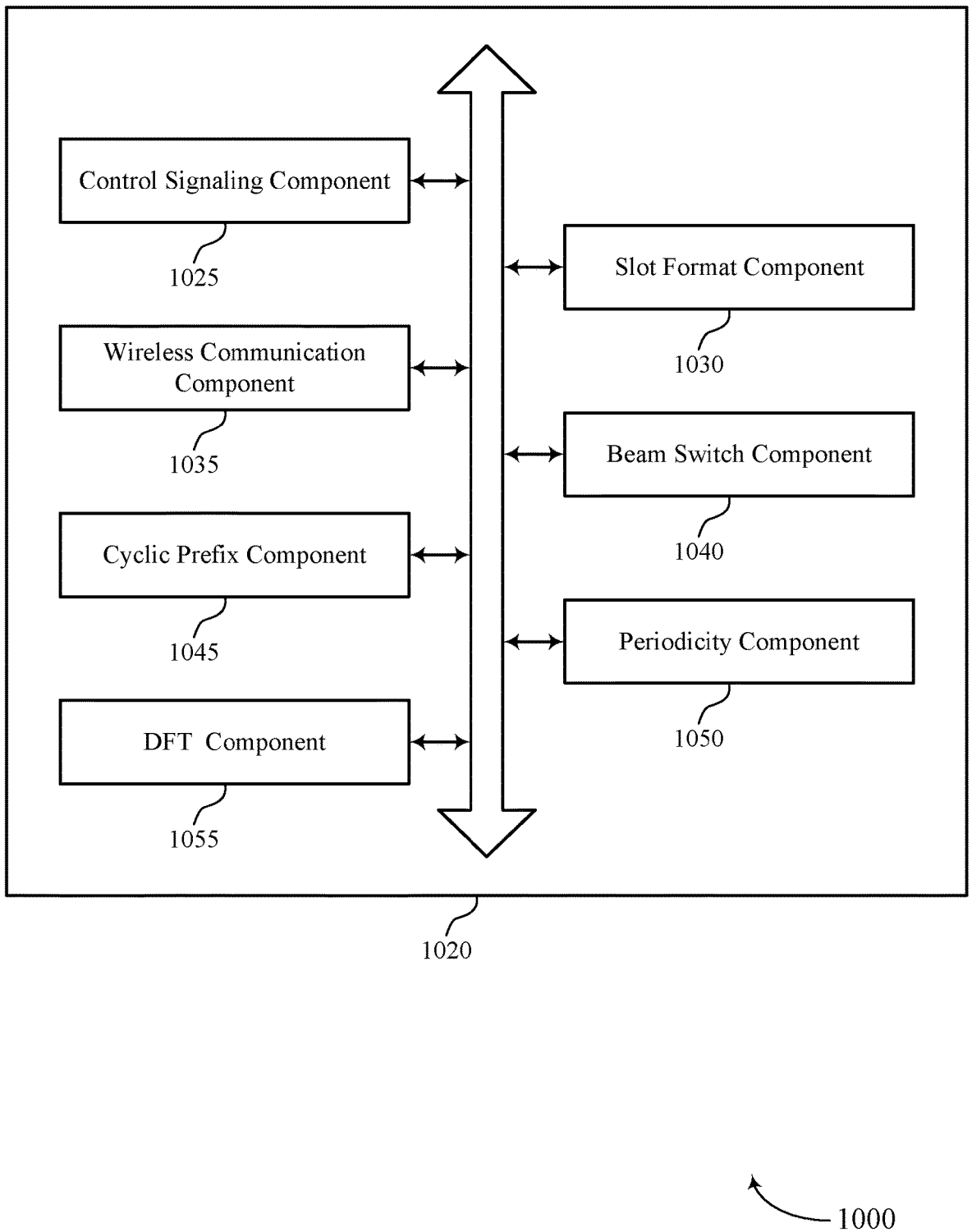
FIG. 10 shows a block diagram of a communications manager that supports techniques for a combined cyclic prefix and guard interval-based waveform in accordance with aspects of the present disclosure.

FIG. 10 shows a block diagram 1000 of a communications manager 1020 that supports techniques for a combined cyclic prefix and guard interval-based waveform in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for a combined cyclic prefix and guard interval-based waveform as described herein. For example, the communications manager 1020 may include a control signaling component 1025, a slot format component 1030, a wireless communication component 1035, a beam switch component 1040, a cyclic prefix component 1045, a periodicity component 1050, a DFT component 1055, or any combination thereof. Each of these components may communicate, directly or indirectly, with one another (e.g., via one or more buses).

The communications manager 1020 may support wireless communication at a UE in accordance with examples as disclosed herein. The control signaling component 1025 may be configured as or otherwise support a means for receiving control signaling indicating a slot configuration. The slot format component 1030 may be configured as or otherwise support a means for identifying a format of a slot including a set of symbols based on the slot configuration, where the format indicates that a first portion of a first symbol of the set of symbols includes at least two cyclic prefixes and a second portion of the first symbol includes a guard interval. The wireless communication component 1035 may be configured as or otherwise support a means for performing the wireless communication during the first symbol in accordance with the format.

In some examples, the wireless communication component 1035 may be configured as or otherwise support a means for performing the wireless communication during a second symbol of the set of symbols, the first symbol and the second symbol are contiguous in a time domain. In some examples, the format indicates that the second symbol includes a second guard interval, and the at least two cyclic prefixes in the first symbol are based on the second symbol. In some examples, the DFT component 1055 may be configured as or otherwise support a means for performing a DFT operation on each of the first symbol and the second symbol. In some examples, a first DFT size for the first symbol is the same as a second DFT size for the second symbol.

In some examples, the control signaling component 1025 may be configured as or otherwise support a means for receiving the control signaling based on one or more of a beam switch operation or a resource allocation operation, the control signaling enabling the format for the slot and indicating use of the at least two cyclic prefixes. In some examples, the beam switch component 1040 may be configured as or otherwise support a means for performing a beam switch operation during one or more of the at least two cyclic prefixes based on the slot configuration. In some examples, the cyclic prefix component 1045 may be configured as or otherwise support a means for transmitting the wireless communication via one or more of the at least two cyclic prefixes, where the wireless communication is based on one or more of a delay spread satisfying a threshold or an absence of a beam switch. In some examples, the control signaling indicates a first configuration for a first subset of symbols of the set of symbols, the first subset of symbols including the first symbol and one or more second symbols.

In some examples, the control signaling component 1025 may be configured as or otherwise support a means for receiving an indication identifying a second configuration for a second subset of symbols. In some examples, the slot format component 1030 may be configured as or otherwise support a means for determining a second format for the second subset of symbols based on the second configuration. In some examples, the wireless communication component 1035 may be configured as or otherwise support a means for performing the wireless communication during the second subset of symbols in accordance with the second format.

In some examples, the periodicity component 1050 may be configured as or otherwise support a means for determining a periodicity based on the slot configuration. In some examples, the periodicity component 1050 may be configured as or otherwise support a means for performing the wireless communication during one or more of the first symbol and a second symbol in the slot based on the periodicity, the second symbol including at least two respective cyclic prefixes and a respective guard interval.

In some examples, to support receiving the control signaling, the control signaling component 1025 may be configured as or otherwise support a means for receiving an RRC message including the slot configuration. In some examples, determining the format is further based on the RRC message. In some examples, to support receiving the control signaling, the control signaling component 1025 may be configured as or otherwise support a means for receiving one or more of an RRC message, a DCI, or a MAC-CE, indicating the slot configuration. In some examples, determining the format is further based on one or more of the RRC message, the DCI, or the MAC-CE.

In some examples, the set of symbols, the at least two cyclic prefixes, the guard interval, and one or more other guard intervals corresponding to the set of symbols are within boundaries of the slot. In some examples, the first portion of the first slot is at a beginning portion of the first slot and the second portion of the first slot is at an ending portion of the first slot. In some examples, the wireless communication includes a single carrier waveform.

Figure 11:
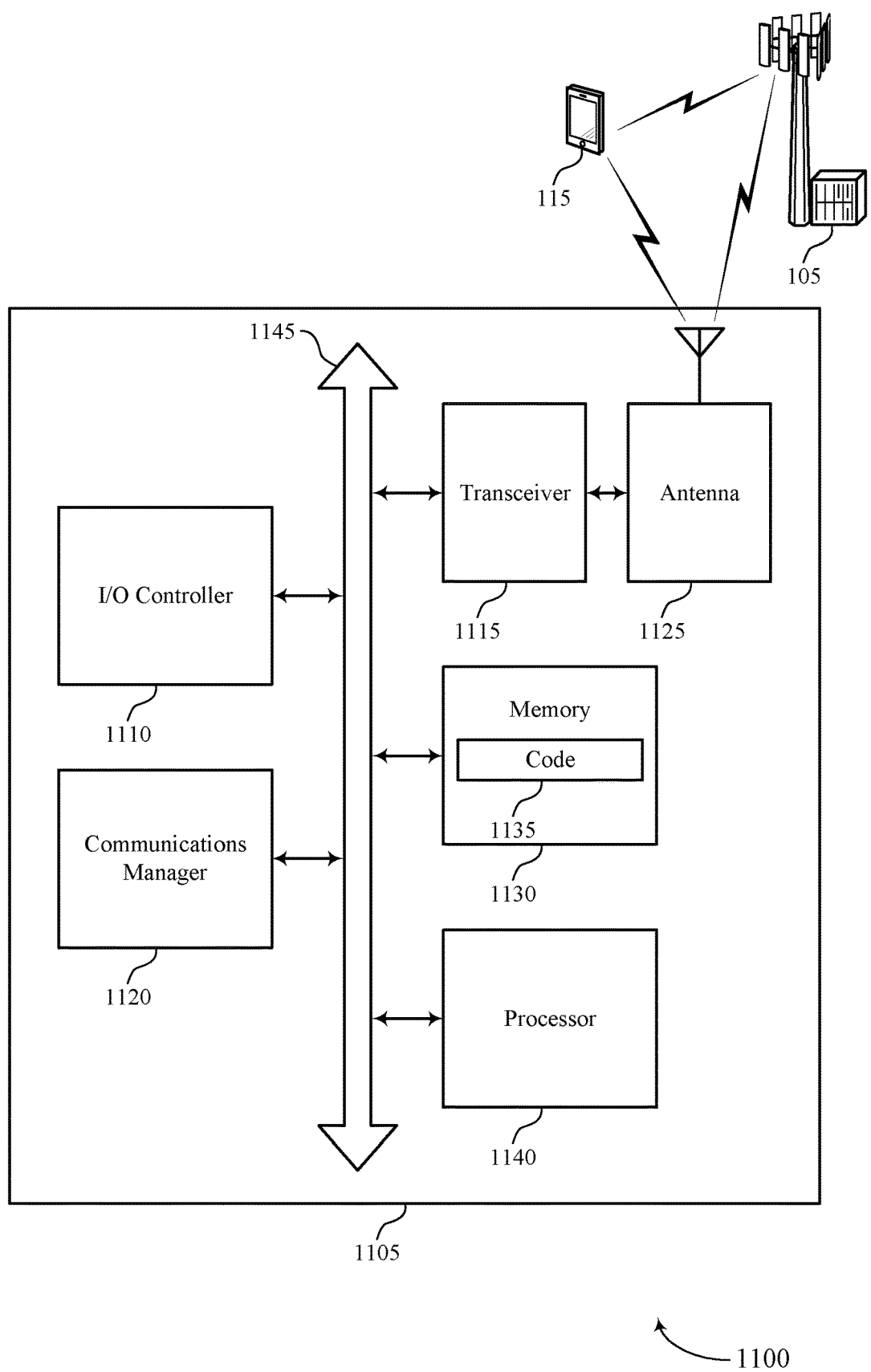
FIG. 11 shows a diagram of a system including a device that supports techniques for a combined cyclic prefix and guard interval-based waveform in accordance with aspects of the present disclosure.

FIG. 11 shows a diagram of a system 1100 including a device 1105 that supports techniques for a combined cyclic prefix and guard interval-based waveform in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for a combined cyclic prefix and guard interval-based waveform). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving control signaling indicating a slot configuration. The communications manager 1120 may be configured as or otherwise support a means for identifying a format of a slot including a set of symbols based on the slot configuration, where the format indicates that a first portion of a first symbol of the set of symbols includes at least two cyclic prefixes and a second portion of the first symbol includes a guard interval. The communications manager 1120 may be configured as or otherwise support a means for performing the wireless communication during the first symbol in accordance with the format.

By including or configuring the communications manager 1120 in accordance with examples as described herein, the device 1105 may support techniques for improved communication reliability, reduced latency, more efficient utilization of communication resources, and improved coordination between devices. The device 1105 may transmit or receive known data sequences via guard intervals, which may provide for reduced latency and more efficient utilization of communication resources as compared to random data that may be transmitted via cyclic prefixes. However, some guard interval-based waveforms may not be slot-contained, which may reduce reliability and latency. By supporting a combined cyclic prefix and guard interval-based waveform, the device 1105 may support a slot-contained waveform that includes guard intervals, which may improve reliability, improve efficiency, and reduce latency. Additionally or alternatively, the combined cyclic prefix and guard interval-based waveform may support extra cyclic prefixes in a first symbol of a slot, such that the device 1105 may perform a beam switch operation or transmit known data sequences during one or more of the cyclic prefixes. Such techniques may reduce latency and improve resource utilization.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for a combined cyclic prefix and guard interval-based waveform as described herein, or the processor 1140 and the memory 1130 may be otherwise configured to perform or support such operations.

Figure 12:
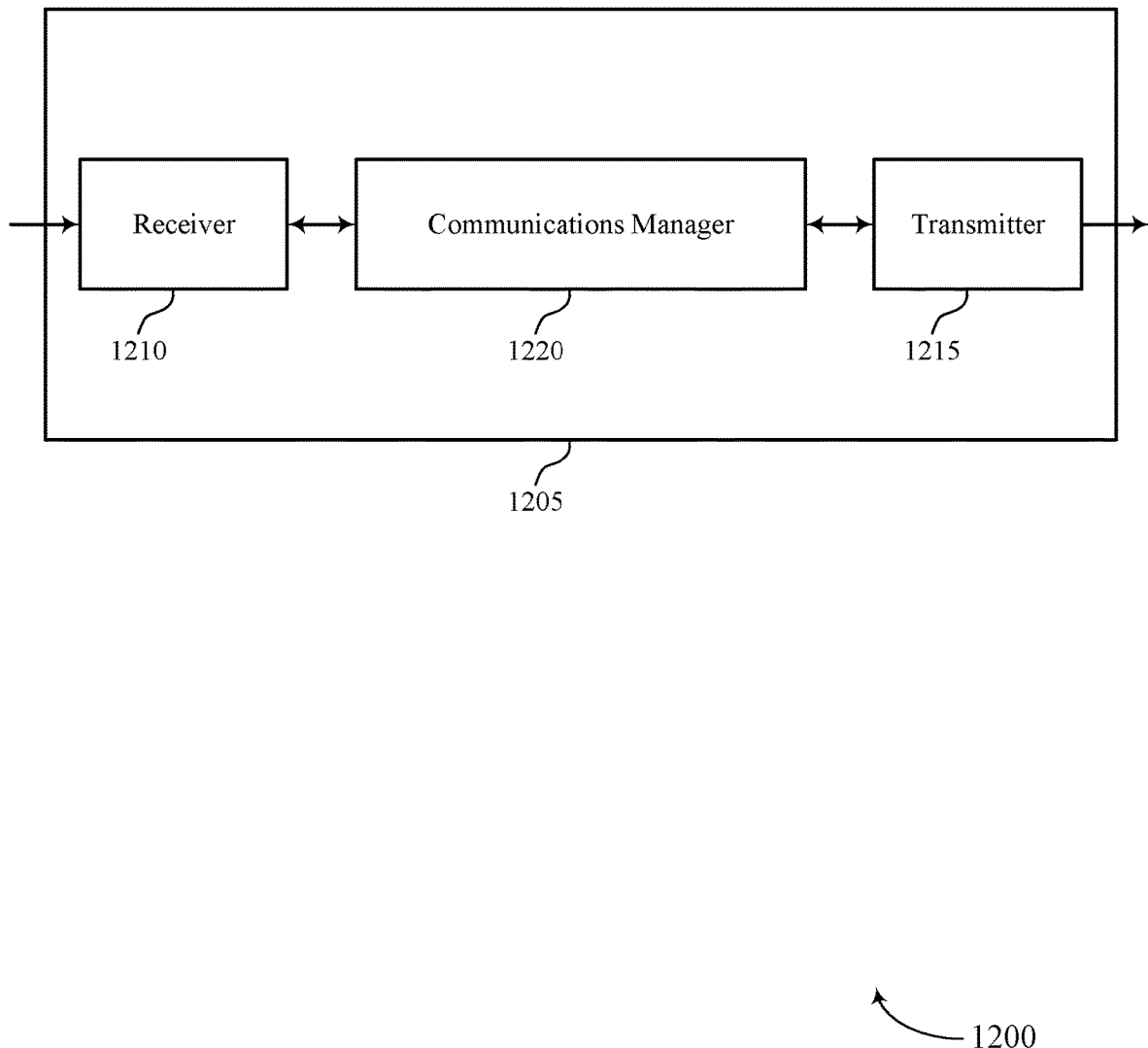
FIGS. 12 and 13 show block diagrams of devices that support techniques for a combined cyclic prefix and guard interval-based waveform in accordance with aspects of the present disclosure.

FIG. 12 shows a block diagram 1200 of a device 1205 that supports techniques for a combined cyclic prefix and guard interval-based waveform in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for a combined cyclic prefix and guard interval-based waveform). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for a combined cyclic prefix and guard interval-based waveform). In some examples, the transmitter 1215 may be co-located with a receiver 1210 in a transceiver component. The transmitter 1215 may utilize a single antenna or a set of multiple antennas.

The communications manager 1220, the receiver 1210, the transmitter 1215, or various combinations thereof or various components thereof may be examples of means for performing various aspects of techniques for a combined cyclic prefix and guard interval-based waveform as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for identifying a format of a slot including a set of symbols, where the format indicates that a first portion of a first symbol of the set of symbols includes at least two cyclic prefixes and a second portion of the first symbol includes a guard interval. The communications manager 1220 may be configured as or otherwise support a means for transmitting, to a UE, control signaling indicating a slot configuration based on the format. The communications manager 1220 may be configured as or otherwise support a means for performing the wireless communication during the first symbol in accordance with the slot configuration.

Figure 13:
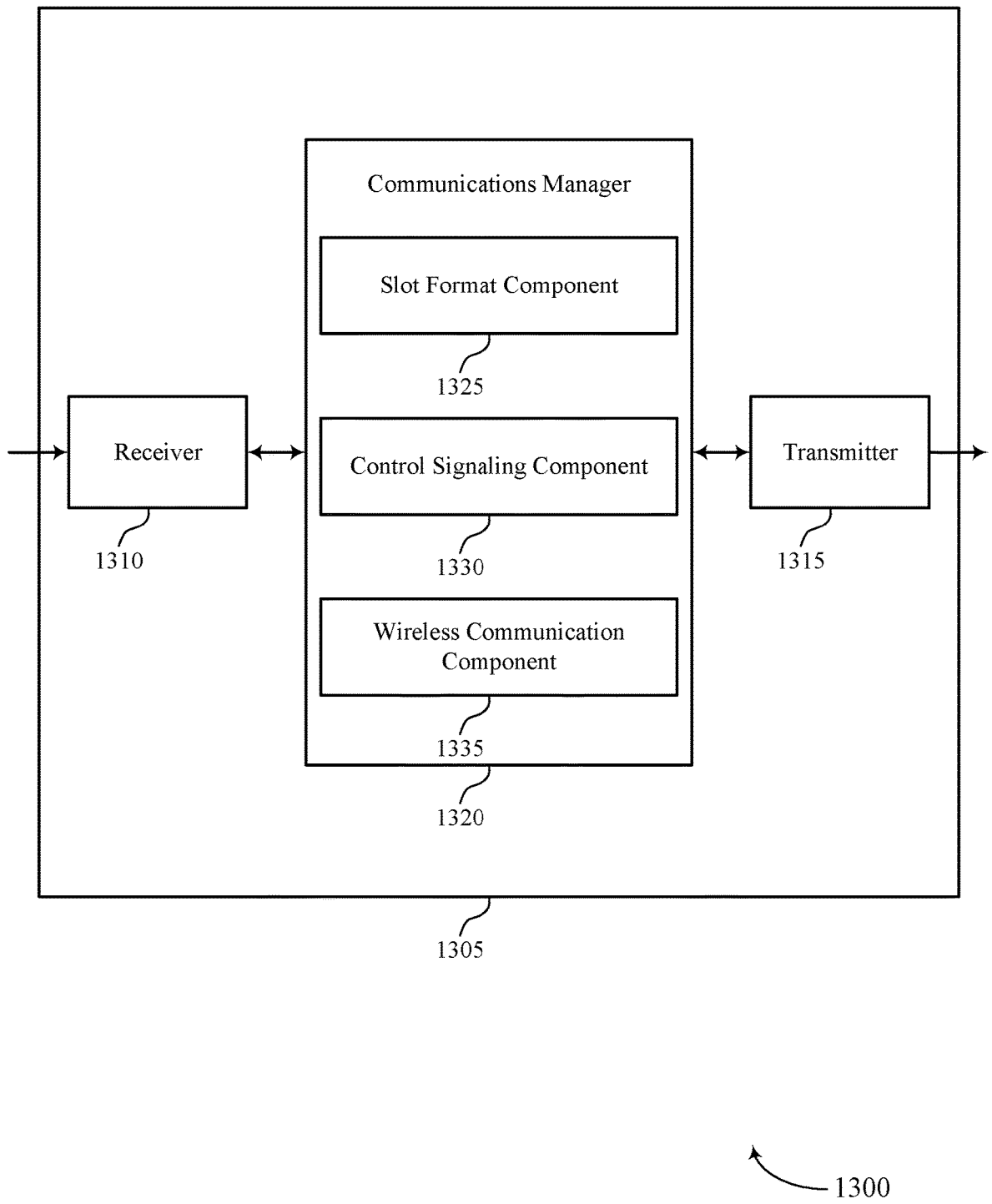

FIG. 13 shows a block diagram 1300 of a device 1305 that supports techniques for a combined cyclic prefix and guard interval-based waveform in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for a combined cyclic prefix and guard interval-based waveform). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for a combined cyclic prefix and guard interval-based waveform). In some examples, the transmitter 1315 may be co-located with a receiver 1310 in a transceiver component. The transmitter 1315 may utilize a single antenna or a set of multiple antennas.

The device 1305, or various components thereof, may be an example of means for performing various aspects of techniques for a combined cyclic prefix and guard interval-based waveform as described herein. For example, the communications manager 1320 may include a slot format component 1325, a control signaling component 1330, a wireless communication component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The slot format component 1325 may be configured as or otherwise support a means for identifying a format of a slot including a set of symbols, where the format indicates that a first portion of a first symbol of the set of symbols includes at least two cyclic prefixes and a second portion of the first symbol includes a guard interval. The control signaling component 1330 may be configured as or otherwise support a means for transmitting, to a UE, control signaling indicating a slot configuration based on the format. The wireless communication component 1335 may be configured as or otherwise support a means for performing the wireless communication during the first symbol in accordance with the slot configuration.

Figure 14:
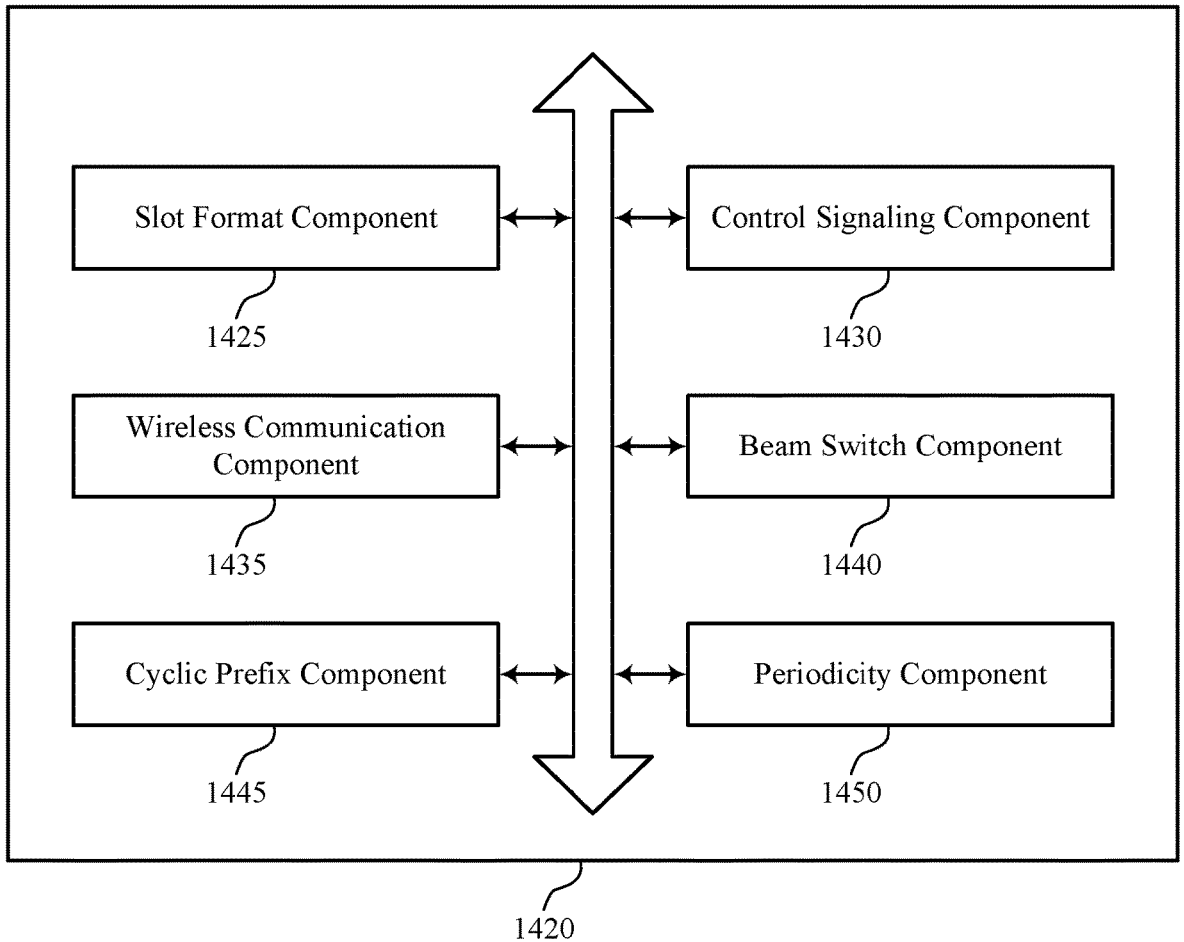
FIG. 14 shows a block diagram of a communications manager that supports techniques for a combined cyclic prefix and guard interval-based waveform in accordance with aspects of the present disclosure.

FIG. 14 shows a block diagram 1400 of a communications manager 1420 that supports techniques for a combined cyclic prefix and guard interval-based waveform in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for a combined cyclic prefix and guard interval-based waveform as described herein. For example, the communications manager 1420 may include a slot format component 1425, a control signaling component 1430, a wireless communication component 1435, a beam switch component 1440, a cyclic prefix component 1445, a periodicity component 1450, or any combination thereof. Each of these components may communicate, directly or indirectly, with one another (e.g., via one or more buses).

The communications manager 1420 may support wireless communication at a base station in accordance with examples as disclosed herein. The slot format component 1425 may be configured as or otherwise support a means for identifying a format of a slot including a set of symbols, where the format indicates that a first portion of a first symbol of the set of symbols includes at least two cyclic prefixes and a second portion of the first symbol includes a guard interval. The control signaling component 1430 may be configured as or otherwise support a means for transmitting, to a UE, control signaling indicating a slot configuration based on the format. The wireless communication component 1435 may be configured as or otherwise support a means for performing the wireless communication during the first symbol in accordance with the slot configuration.

In some examples, the wireless communication component 1435 may be configured as or otherwise support a means for performing the wireless communication during a second symbol of the set of symbols, the first symbol and the second symbol are contiguous in a time domain. In some examples, the format indicates that the second symbol includes a second guard interval, and the at least two cyclic prefixes in the first symbol are based on the second symbol. In some examples, a first DFT size for the first symbol is the same as a second DFT size for the second symbol.

In some examples, the control signaling component 1430 may be configured as or otherwise support a means for transmitting the control signaling based on one or more of a beam switch operation or a resource allocation operation, the control signaling enabling the format for the slot and indicating use of the at least two cyclic prefixes. In some examples, the beam switch component 1440 may be configured as or otherwise support a means for performing a beam switch operation during one or more of the at least two cyclic prefixes based on the slot configuration.

In some examples, the cyclic prefix component 1445 may be configured as or otherwise support a means for receiving the wireless communication via one or more of the at least two cyclic prefixes, where the wireless communication is based on one or more of a delay spread satisfying a threshold or an absence of a beam switch. In some examples, the control signaling indicates a first configuration for a first subset of symbols of the set of symbols, the first subset of symbols including the first symbol and one or more second symbols.

In some examples, the slot format component 1425 may be configured as or otherwise support a means for determining a second format for a second subset of symbols of the set of symbols. In some examples, the control signaling component 1430 may be configured as or otherwise support a means for transmitting, to the UE, an indication identifying a second configuration for the second subset of symbols based on the second format. In some examples, the wireless communication component 1435 may be configured as or otherwise support a means for performing the wireless communication during the second subset of symbols in accordance with the second format.

In some examples, the periodicity component 1450 may be configured as or otherwise support a means for determining a periodicity based on the slot configuration. In some examples, the periodicity component 1450 may be configured as or otherwise support a means for performing the wireless communication during one or more of the first symbol and a second symbol in the slot based on the periodicity, the second symbol including at least two respective cyclic prefixes and a respective guard interval.

In some examples, to support transmitting the control signaling, the control signaling component 1430 may be configured as or otherwise support a means for transmitting an RRC message including the slot configuration. In some examples, to support transmitting the control signaling, the control signaling component 1430 may be configured as or otherwise support a means for transmitting one or more of an RRC message, a DCI, or a MAC-CE indicating the slot configuration. In some examples, the set of symbols, the at least two cyclic prefixes, and a set of multiple guard intervals corresponding to the set of symbols are within boundaries of the slot. In some examples, the wireless communication includes a single carrier waveform.

Figure 15:
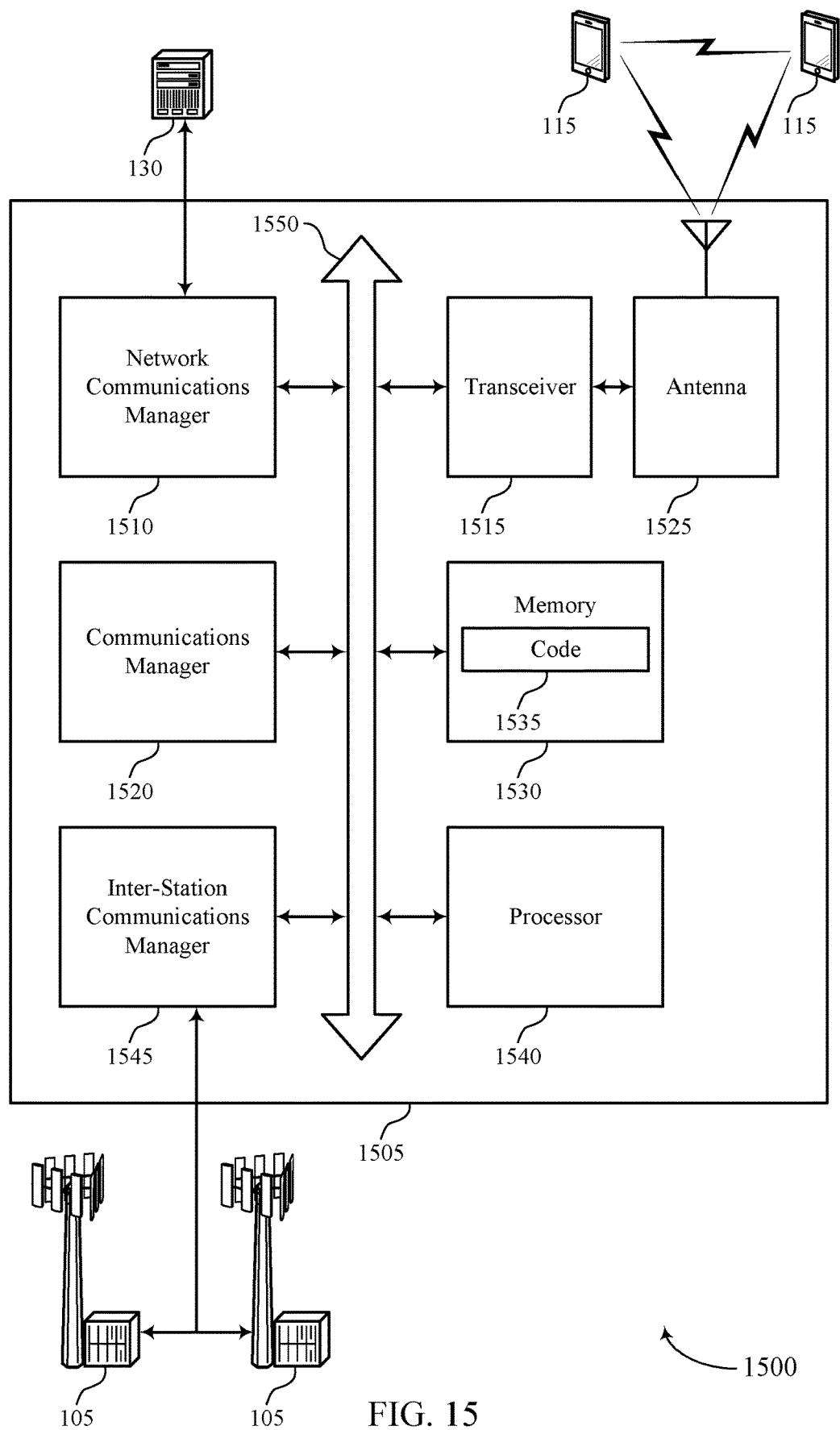
FIG. 15 shows a diagram of a system including a device that supports techniques for a combined cyclic prefix and guard interval-based waveform in accordance with aspects of the present disclosure.

FIG. 15 shows a diagram of a system 1500 including a device 1505 that supports techniques for a combined cyclic prefix and guard interval-based waveform in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for a combined cyclic prefix and guard interval-based waveform). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for identifying a format of a slot including a set of symbols, where the format indicates that a first portion of a first symbol of the set of symbols includes at least two cyclic prefixes and a second portion of the first symbol includes a guard interval. The communications manager 1520 may be configured as or otherwise support a means for transmitting, to a UE, control signaling indicating a slot configuration based on the format. The communications manager 1520 may be configured as or otherwise support a means for performing the wireless communication during the first symbol in accordance with the slot configuration.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for a combined cyclic prefix and guard interval-based waveform as described herein, or the processor 1540 and the memory 1530 may be otherwise configured to perform or support such operations.

Figure 16:
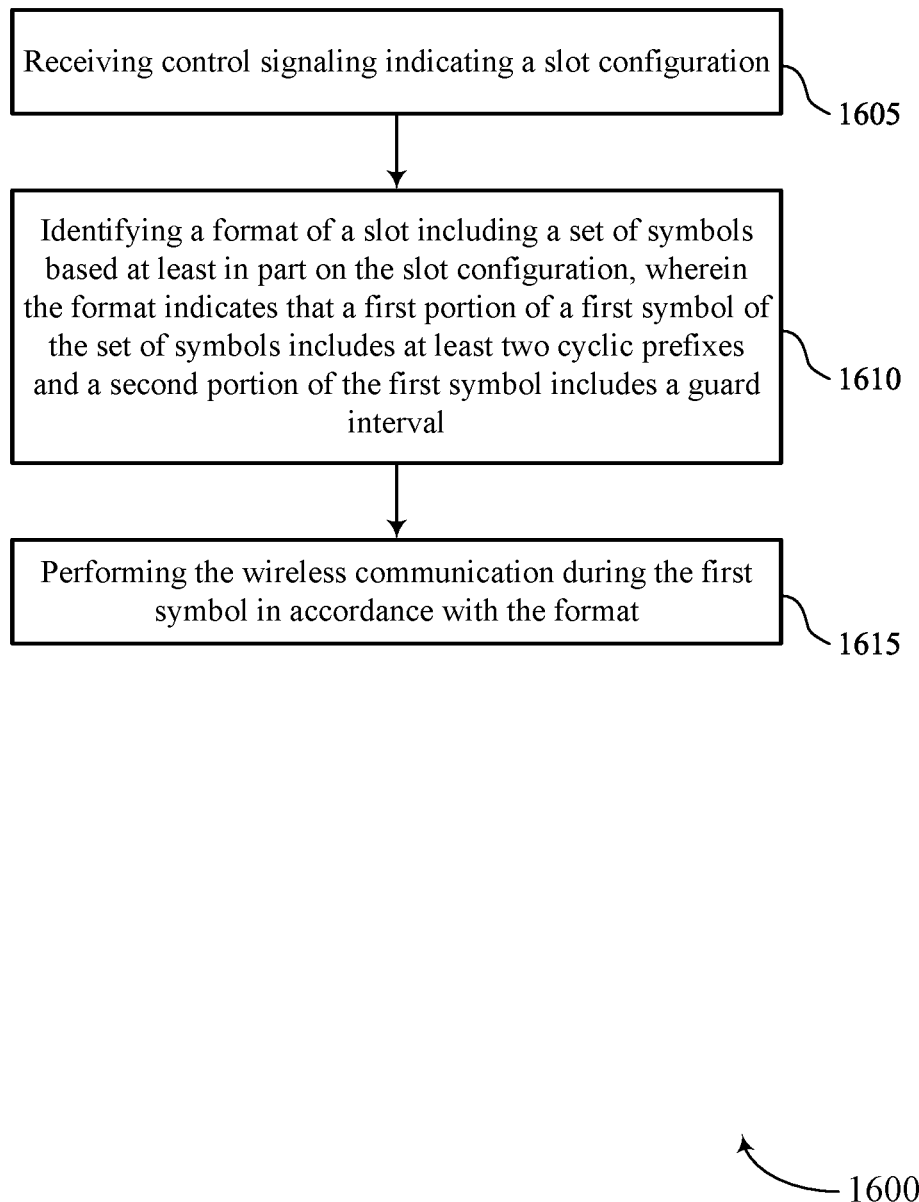
FIGS. 16 through 18 show flowcharts illustrating methods that support techniques for a combined cyclic prefix and guard interval-based waveform in accordance with aspects of the present disclosure.

FIG. 16 shows a flowchart illustrating a method 1600 that supports techniques for a combined cyclic prefix and guard interval-based waveform in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a slot configuration. The operations of 1605 may be performed in accordance with examples as disclosed herein. In some examples, aspects of the operations of 1605 may be performed by a control signaling component 1025 as described with reference to FIG. 10.

At 1610, the method may include identifying a format of a slot including a set of symbols based on the slot configuration, where the format indicates that a first portion of a first symbol of the set of symbols includes at least two cyclic prefixes and a second portion of the first symbol includes a guard interval. The operations of 1610 may be performed in accordance with examples as disclosed herein. In some examples, aspects of the operations of 1610 may be performed by a slot format component 1030 as described with reference to FIG. 10.

At 1615, the method may include performing the wireless communication during the first symbol in accordance with the format. The operations of 1615 may be performed in accordance with examples as disclosed herein. In some examples, aspects of the operations of 1615 may be performed by a wireless communication component 1035 as described with reference to FIG. 10.

Figure 17:
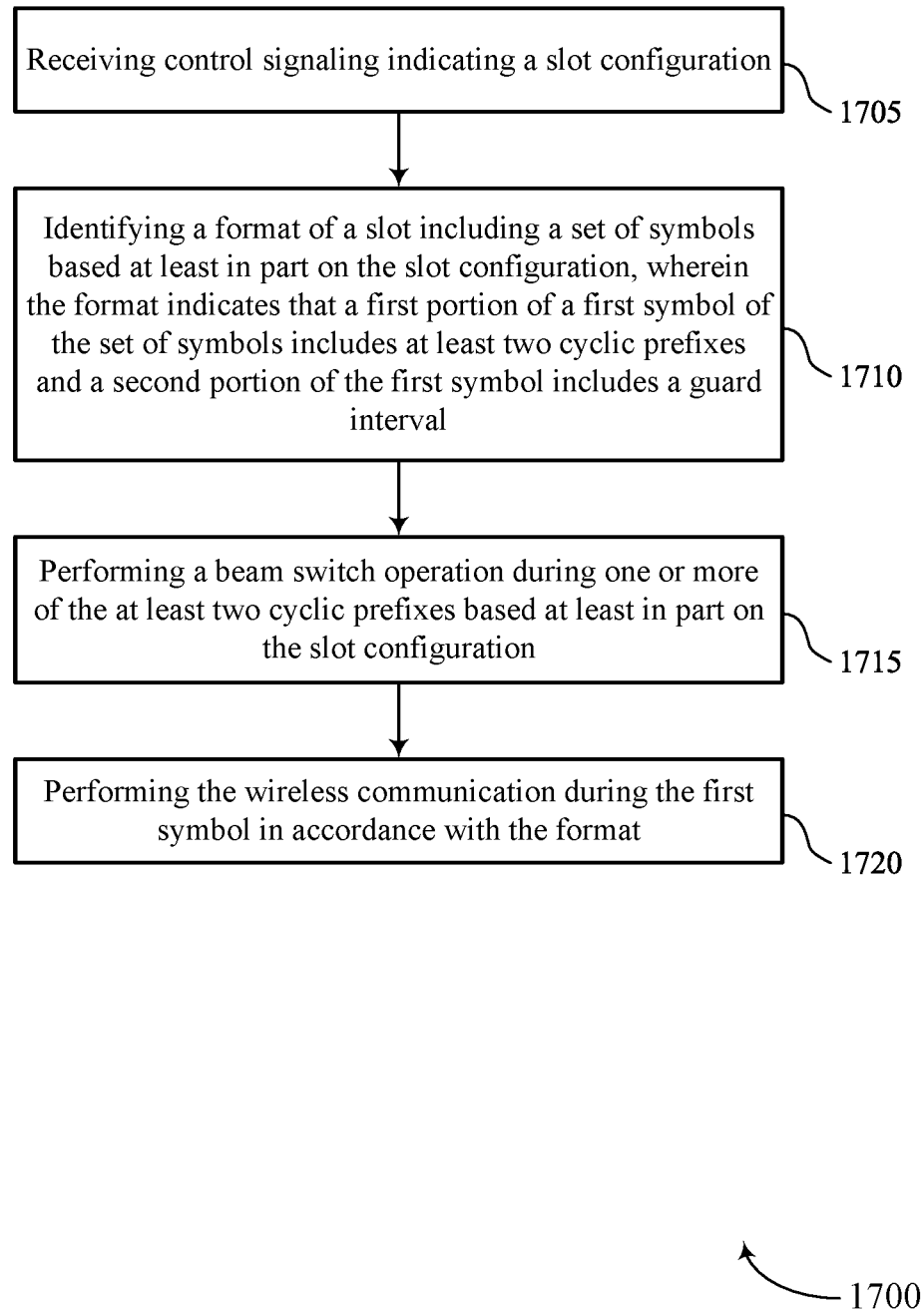

FIG. 17 shows a flowchart illustrating a method 1700 that supports techniques for a combined cyclic prefix and guard interval-based waveform in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving control signaling indicating a slot configuration. The operations of 1705 may be performed in accordance with examples as disclosed herein. In some examples, aspects of the operations of 1705 may be performed by a control signaling component 1025 as described with reference to FIG. 10.

At 1710, the method may include identifying a format of a slot including a set of symbols based on the slot configuration, where the format indicates that a first portion of a first symbol of the set of symbols includes at least two cyclic prefixes and a second portion of the first symbol includes a guard interval. The operations of 1710 may be performed in accordance with examples as disclosed herein. In some examples, aspects of the operations of 1710 may be performed by a slot format component 1030 as described with reference to FIG. 10.

At 1715, the method may include performing a beam switch operation during one or more of the at least two cyclic prefixes based on the slot configuration. The operations of 1715 may be performed in accordance with examples as disclosed herein. In some examples, aspects of the operations of 1715 may be performed by a beam switch component 1040 as described with reference to FIG. 10.

At 1720, the method may include performing the wireless communication during the first symbol in accordance with the format. The operations of 1720 may be performed in accordance with examples as disclosed herein. In some examples, aspects of the operations of 1720 may be performed by a wireless communication component 1035 as described with reference to FIG. 10.

Figure 18:
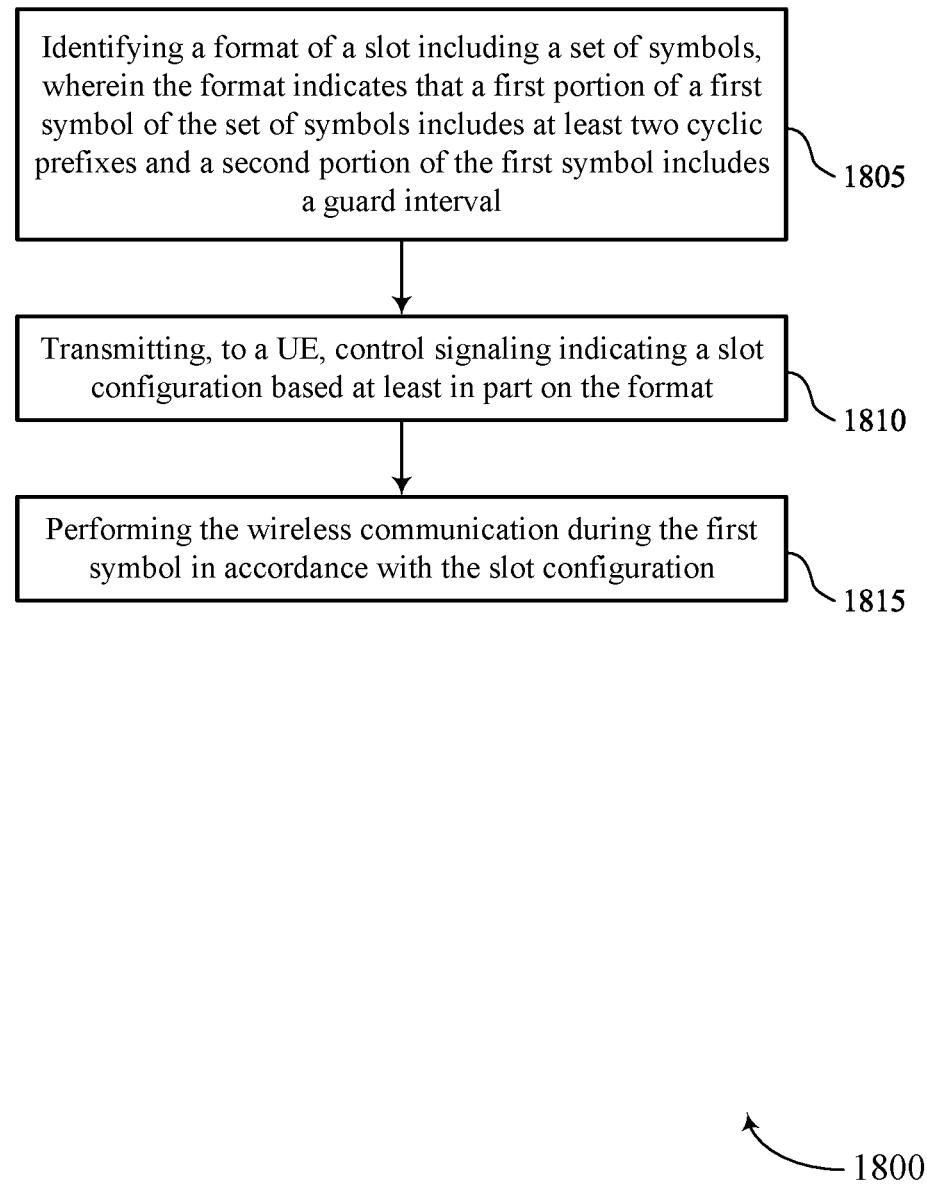

FIG. 18 shows a flowchart illustrating a method 1800 that supports techniques for a combined cyclic prefix and guard interval-based waveform in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include identifying a format of a slot including a set of symbols, where the format indicates that a first portion of a first symbol of the set of symbols includes at least two cyclic prefixes and a second portion of the first symbol includes a guard interval. The operations of 1805 may be performed in accordance with examples as disclosed herein. In some examples, aspects of the operations of 1805 may be performed by a slot format component 1425 as described with reference to FIG. 14.

At 1810, the method may include transmitting, to a UE, control signaling indicating a slot configuration based on the format. The operations of 1810 may be performed in accordance with examples as disclosed herein. In some examples, aspects of the operations of 1810 may be performed by a control signaling component 1430 as described with reference to FIG. 14.

At 1815, the method may include performing the wireless communication during the first symbol in accordance with the slot configuration. The operations of 1815 may be performed in accordance with examples as disclosed herein. In some examples, aspects of the operations of 1815 may be performed by a wireless communication component 1435 as described with reference to FIG. 14.

The following provides an overview of aspects of the present disclosure:

Aspect 1: A method for wireless communication at a UE, comprising: receiving control signaling indicating a slot configuration; identifying a format of a slot including a set of symbols based at least in part on the slot configuration, wherein the format indicates that a first portion of a first symbol of the set of symbols includes at least two cyclic prefixes and a second portion of the first symbol includes a guard interval; and performing the wireless communication during the first symbol in accordance with the format.

Aspect 2: The method of aspect 1, further comprising: performing the wireless communication during a second symbol of the set of symbols, the first symbol and the second symbol are contiguous in a time domain, wherein the format indicates that the second symbol includes a second guard interval, and the at least two cyclic prefixes in the first symbol are based at least in part on the second symbol.

Aspect 3: The method of aspect 2, further comprising: performing a DFT operation on each of the first symbol and the second symbol, wherein a first DFT size for the first symbol is the same as a second DFT size for the second symbol.

Aspect 4: The method of any of aspects 1 through 3, further comprising: receiving the control signaling based at least in part on one or more of a beam switch operation or a resource allocation operation, the control signaling enabling the format for the slot and indicating use of the at least two cyclic prefixes.

Aspect 5: The method of any of aspects 1 through 4, further comprising: performing a beam switch operation during one or more of the at least two cyclic prefixes based at least in part on the slot configuration.

Aspect 6: The method of any of aspects 1 through 5, further comprising: transmitting the wireless communication via one or more of the at least two cyclic prefixes, wherein the wireless communication is based at least in part on one or more of a delay spread satisfying a threshold or an absence of a beam switch.

Aspect 7: The method of any of aspects 1 through 6, wherein the control signaling indicates a first configuration for a first subset of symbols of the set of symbols, the first subset of symbols including the first symbol and one or more second symbols.

Aspect 8: The method of aspect 7, further comprising: receiving an indication identifying a second configuration for a second subset of symbols; determining a second format for the second subset of symbols based at least in part on the second configuration; and performing the wireless communication during the second subset of symbols in accordance with the second format.

Aspect 9: The method of any of aspects 1 through 8, further comprising: determining a periodicity based at least in part on the slot configuration; and performing the wireless communication during one or more of the first symbol and a second symbol in the slot based at least in part on the periodicity, the second symbol including at least two respective cyclic prefixes and a respective guard interval.

Aspect 10: The method of any of aspects 1 through 9, wherein receiving the control signaling comprises: receiving an RRC message including the slot configuration, wherein determining the format is further based at least in part on the RRC message.

Aspect 11: The method of any of aspects 1 through 10, wherein receiving the control signaling comprises: receiving one or more of an RRC message, a DCI, or a MAC-CE, indicating the slot configuration, wherein determining the format is further based at least in part on one or more of the RRC message, the DCI, or the MAC-CE.

Aspect 12: The method of any of aspects 1 through 11, wherein the set of symbols, the at least two cyclic prefixes, the guard interval, and one or more other guard intervals corresponding to the set of symbols are within boundaries of the slot.

Aspect 13: The method of any of aspects 1 through 12, wherein the first portion of the first slot is at a beginning portion of the first slot and the second portion of the first slot is at an ending portion of the first slot.

Aspect 14: The method of any of aspects 1 through 13, wherein the wireless communication includes a single carrier waveform.

Aspect 15: A method for wireless communication at a base station, comprising: identifying a format of a slot including a set of symbols, wherein the format indicates that a first portion of a first symbol of the set of symbols includes at least two cyclic prefixes and a second portion of the first symbol includes a guard interval; transmitting, to a UE, control signaling indicating a slot configuration based at least in part on the format; and performing the wireless communication during the first symbol in accordance with the slot configuration.

Aspect 16: The method of aspect 15, further comprising: performing the wireless communication during a second symbol of the set of symbols, the first symbol and the second symbol are contiguous in a time domain, wherein the format indicates that the second symbol includes a second guard interval, and the at least two cyclic prefixes in the first symbol are based at least in part on the second symbol.

Aspect 17: The method of aspect 16, wherein a first DFT size for the first symbol is the same as a second DFT size for the second symbol.

Aspect 18: The method of any of aspects 15 through 17, further comprising: transmitting the control signaling based at least in part on one or more of a beam switch operation or a resource allocation operation, the control signaling enabling the format for the slot and indicating use of the at least two cyclic prefixes.

Aspect 19: The method of any of aspects 15 through 18, further comprising: performing a beam switch operation during one or more of the at least two cyclic prefixes based at least in part on the slot configuration.

Aspect 20: The method of any of aspects 15 through 19, further comprising: receiving the wireless communication via one or more of the at least two cyclic prefixes, wherein the wireless communication is based at least in part on one or more of a delay spread satisfying a threshold or an absence of a beam switch.

Aspect 21: The method of any of aspects 15 through 20, wherein the control signaling indicates a first configuration for a first subset of symbols of the set of symbols, the first subset of symbols including the first symbol and one or more second symbols.

Aspect 22: The method of aspect 21, further comprising: determining a second format for a second subset of symbols of the set of symbols; and transmitting, to the UE, an indication identifying a second configuration for the second subset of symbols based at least in part on the second format; and performing the wireless communication during the second subset of symbols in accordance with the second format.

Aspect 23: The method of any of aspects 15 through 22, further comprising: determining a periodicity based at least in part on the slot configuration; and performing the wireless communication during one or more of the first symbol and a second symbol in the slot based at least in part on the periodicity, the second symbol including at least two respective cyclic prefixes and a respective guard interval.

Aspect 24: The method of any of aspects 15 through 23, wherein transmitting the control signaling comprises: transmitting an RRC message including the slot configuration.

Aspect 25: The method of any of aspects 15 through 24, wherein transmitting the control signaling comprises: transmitting one or more of an RRC message, a DCI, or a MAC-CE indicating the slot configuration.

Aspect 26: The method of any of aspects 15 through 25, wherein the set of symbols, the at least two cyclic prefixes, and a plurality of guard intervals corresponding to the set of symbols are within boundaries of the slot.

Aspect 27: The method of any of aspects 15 through 26, wherein the wireless communication includes a single carrier waveform.

Aspect 28: An apparatus for wireless communication at a UE, comprising a processor; memory coupled with the processor; and instructions stored in the memory and executable by the processor to cause the apparatus to perform a method of any of aspects 1 through 14.

Aspect 29: An apparatus for wireless communication at a UE, comprising at least one means for performing a method of any of aspects 1 through 14.

Aspect 30: A non-transitory computer-readable medium storing code for wireless communication at a UE, the code comprising instructions executable by a processor to perform a method of any of aspects 1 through 14.

Aspect 31: An apparatus for wireless communication at a base station, comprising a processor; memory coupled with the processor; and instructions stored in the memory and executable by the processor to cause the apparatus to perform a method of any of aspects 15 through 27.

Aspect 32: An apparatus for wireless communication at a base station, comprising at least one means for performing a method of any of aspects 15 through 27.

Aspect 33: A non-transitory computer-readable medium storing code for wireless communication at a base station, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving control signaling indicating a slot configuration;
identifying a format of a slot including a set of symbols based at least in part on the slot configuration, wherein the format indicates that
a first portion of a first symbol of the set of symbols includes at least two cyclic prefixes and a second portion of the first symbol includes a guard interval; and
a second symbol of the set of symbols includes a second guard interval;
performing the wireless communication during the first symbol in accordance with the format; and
performing the wireless communication during the second symbol of the set of symbols, the first symbol and the second symbol are contiguous in a time domain.

2. The method of claim 1,
wherein the at least two cyclic prefixes in the first symbol are based at least in part on the second symbol.

3. The method of claim 2, further comprising:
performing a discrete Fourier transform operation on each of the first symbol and the second symbol,
wherein a first discrete Fourier transform size for the first symbol is the same as a second discrete Fourier transform size for the second symbol.

4. The method of claim 1, further comprising:
receiving the control signaling based at least in part on one or more of a beam switch operation or a resource allocation operation, the control signaling enabling the format for the slot and indicating use of the at least two cyclic prefixes.

5. The method of claim 1, further comprising:
performing a beam switch operation during one or more of the at least two cyclic prefixes based at least in part on the slot configuration.

6. The method of claim 1, further comprising:
transmitting the wireless communication via one or more of the at least two cyclic prefixes, wherein the wireless communication is based at least in part on one or more of a delay spread satisfying a threshold or an absence of a beam switch.

7. The method of claim 1, wherein the control signaling indicates a first configuration for a first subset of symbols of the set of symbols, the first subset of symbols including the first symbol and one or more second symbols.

8. The method of claim 7, further comprising:
receiving an indication identifying a second configuration for a second subset of symbols;
determining a second format for the second subset of symbols based at least in part on the second configuration; and
performing the wireless communication during the second subset of symbols in accordance with the second format.

9. The method of claim 1, further comprising:
determining a periodicity based at least in part on the slot configuration; and
performing the wireless communication during one or more of the first symbol and a second symbol in the slot based at least in part on the periodicity, the second symbol including at least two respective cyclic prefixes and a respective guard interval.

10. The method of claim 1, wherein receiving the control signaling comprises:
receiving a radio resource control message including the slot configuration,
wherein determining the format is further based at least in part on the radio resource control message.

11. The method of claim 1, wherein receiving the control signaling comprises:
receiving one or more of a radio resource control message, a downlink control information, or a medium access control-control element, indicating the slot configuration,
wherein determining the format is further based at least in part on one or more of the radio resource control message, the downlink control information, or the medium access control-control element.

12. The method of claim 1, wherein the set of symbols, the at least two cyclic prefixes, the guard interval, and one or more other guard intervals corresponding to the set of symbols are within boundaries of the slot.

13. The method of claim 1, wherein the first portion of the first symbol is at a beginning portion of the slot.

14. The method of claim 1, wherein the wireless communication includes a single carrier waveform.

15. A method for wireless communication at a base station, comprising:
identifying a format of a slot including a set of symbols, wherein the format indicates that
a first portion of a first symbol of the set of symbols includes at least two cyclic prefixes and a second portion of the first symbol includes a guard interval; and
a second symbol of the set of symbols includes a second guard interval;
transmitting, to a user equipment (UE), control signaling indicating a slot configuration based at least in part on the format; and
performing the wireless communication during the first symbol in accordance with the slot configuration; and
performing the wireless communication during the second symbol of the set of symbols, the first symbol and the second symbol are contiguous in a time domain.

16. The method of claim 15,
wherein the at least two cyclic prefixes in the first symbol are based at least in part on the second symbol.

17. The method of claim 16, wherein a first discrete Fourier transform size for the first symbol is the same as a second discrete Fourier transform size for the second symbol.

18. The method of claim 15, further comprising:
transmitting the control signaling based at least in part on one or more of a beam switch operation or a resource allocation operation, the control signaling enabling the format for the slot and indicating use of the at least two cyclic prefixes.

19. The method of claim 15, further comprising:
performing a beam switch operation during one or more of the at least two cyclic prefixes based at least in part on the slot configuration.

20. The method of claim 15, further comprising:
receiving the wireless communication via one or more of the at least two cyclic prefixes, wherein the wireless communication is based at least in part on one or more of a delay spread satisfying a threshold or an absence of a beam switch.

21. The method of claim 15, wherein the control signaling indicates a first configuration for a first subset of symbols of the set of symbols, the first subset of symbols including the first symbol and one or more second symbols.

22. The method of claim 21, further comprising:
determining a second format for a second subset of symbols of the set of symbols; and
transmitting, to the UE, an indication identifying a second configuration for the second subset of symbols based at least in part on the second format; and
performing the wireless communication during the second subset of symbols in accordance with the second format.

23. The method of claim 15, further comprising:
determining a periodicity based at least in part on the slot configuration; and
performing the wireless communication during one or more of the first symbol and a second symbol in the slot based at least in part on the periodicity, the second symbol including at least two respective cyclic prefixes and a respective guard interval.

24. The method of claim 15, wherein transmitting the control signaling comprises:
transmitting a radio resource control message including the slot configuration.

25. The method of claim 15, wherein transmitting the control signaling comprises:
transmitting one or more of a radio resource control message, a downlink control information, or a medium access control-control element indicating the slot configuration.

26. The method of claim 15, wherein the set of symbols, the at least two cyclic prefixes, and a plurality of guard intervals corresponding to the set of symbols are within boundaries of the slot.

27. The method of claim 15, wherein the wireless communication includes a single carrier waveform.

28. An apparatus for wireless communication at a user equipment (UE), comprising:
a processor;
memory coupled with the processor; and
instructions stored in the memory and executable by the processor to cause the apparatus to:
receive control signaling indicating a slot configuration;
identify a format of a slot including a set of symbols based at least in part on the slot configuration, wherein the format indicates that
a first portion of a first symbol of the set of symbols includes at least two cyclic prefixes and a second portion of the first symbol includes a guard interval; and
a second symbol of the set of symbols includes a second guard interval;
perform the wireless communication during the first symbol in accordance with the format; and
perform the wireless communication during the second symbol of the set of symbols, the first symbol and the second symbol are contiguous in a time domain.

29. The apparatus of claim 28, wherein the instructions are further executable by the processor to cause the apparatus to:
wherein the at least two cyclic prefixes in the first symbol are based at least in part on the second symbol.

30. An apparatus for wireless communication at a base station, comprising:
a processor;
memory coupled with the processor; and
instructions stored in the memory and executable by the processor to cause the apparatus to:
identify a format of a slot including a set of symbols, wherein the format indicates that
a first portion of a first symbol of the set of symbols includes at least two cyclic prefixes and a second portion of the first symbol includes a guard interval; and
a second symbol of the set of symbols includes a second guard interval;
transmit, to a user equipment (UE), control signaling indicating a slot configuration based at least in part on the format; and
perform the wireless communication during the first symbol in accordance with the slot configuration; and
performing the wireless communication during the second symbol of the set of symbols, the first symbol and the second symbol are contiguous in a time domain.

* * * * *